(12) United States Patent
Yokoi et al.

(10) Patent No.: US 11,855,778 B2
(45) Date of Patent: Dec. 26, 2023

(54) NETWORK INTERFACE FOR STORAGE CONTROLLER

(71) Applicant: Hitachi, Ltd., Tokyo (JP)

(72) Inventors: Nobuhiro Yokoi, Tokyo (JP); Hiroka Ihara, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 43 days.

(21) Appl. No.: 17/472,857

(22) Filed: Sep. 13, 2021

(65) Prior Publication Data

US 2022/0255665 A1 Aug. 11, 2022

(30) Foreign Application Priority Data

Feb. 10, 2021 (JP) .................................. 2021-019731

(51) Int. Cl.
*H04L 1/08* (2006.01)

(52) U.S. Cl.
CPC ...................................... *H04L 1/08* (2013.01)

(58) Field of Classification Search
CPC ........ H04L 1/08; H04L 1/1819; H04L 1/1845
See application file for complete search history.

(56) References Cited

U.S. PATENT DOCUMENTS

| | | | | |
|---|---|---|---|---|
| 6,081,907 A * | 6/2000 | Witty | ..................... | H04L 1/0041 714/752 |
| 6,288,739 B1 * | 9/2001 | Hales | ....................... | H04N 7/15 348/E7.083 |
| 6,704,364 B1 * | 3/2004 | Lim | ....................... | H04L 1/0065 375/257 |
| 6,718,347 B1 * | 4/2004 | Wilson | ..................... | G06F 16/27 |
| 7,305,605 B2 | 12/2007 | Shirogane et al. | | |
| 2004/0095950 A1 * | 5/2004 | Shirogane | ............. | H04L 1/0009 370/428 |
| 2005/0076287 A1 * | 4/2005 | Mantong | ............... | H04L 69/161 714/758 |
| 2008/0140932 A1 * | 6/2008 | Flynn | ..................... | G06F 3/0613 711/E12.04 |
| 2009/0024872 A1 * | 1/2009 | Beverly | .............. | G06F 11/0793 714/25 |
| 2009/0193314 A1 * | 7/2009 | Melliar-Smith | .. | H03M 13/2921 714/755 |
| 2012/0054583 A1 * | 3/2012 | Park | ....................... | H04L 1/0083 714/776 |
| 2012/0124121 A1 * | 5/2012 | Pope | .................... | H04L 49/9094 709/201 |
| 2014/0281831 A1 * | 9/2014 | Polehn | .................. | H03M 13/23 714/776 |
| 2014/0286440 A1 * | 9/2014 | Apte | ..................... | H04L 1/0011 375/240.27 |
| 2018/0262778 A1 * | 9/2018 | Keiflin | ................. | H04N 19/176 |

(Continued)

*Primary Examiner* — Albert Decady
*Assistant Examiner* — Enamul M Kabir
(74) *Attorney, Agent, or Firm* — MATTINGLY & MALUR, PC

(57) ABSTRACT

A network interface for a storage controller includes a processor and a memory that stores an instruction code to be executed by the processor. The processor executes protocol processing for transmitting and receiving packets via a network. The processor reproduces a first packet not received from the network, from a plurality of other received packets included in an error correction packet group same as that of the first packet.

12 Claims, 21 Drawing Sheets

(56) References Cited

U.S. PATENT DOCUMENTS

| | | | |
|---|---|---|---|
| 2019/0114236 A1* | 4/2019 | Han | G06F 15/7825 |
| 2019/0254113 A1* | 8/2019 | Berger | H04W 72/23 |
| 2019/0339688 A1* | 11/2019 | Cella | G05B 23/0229 |
| 2019/0394136 A1* | 12/2019 | Ho | H04L 49/552 |
| 2020/0348662 A1* | 11/2020 | Cella | G05B 23/0294 |

* cited by examiner

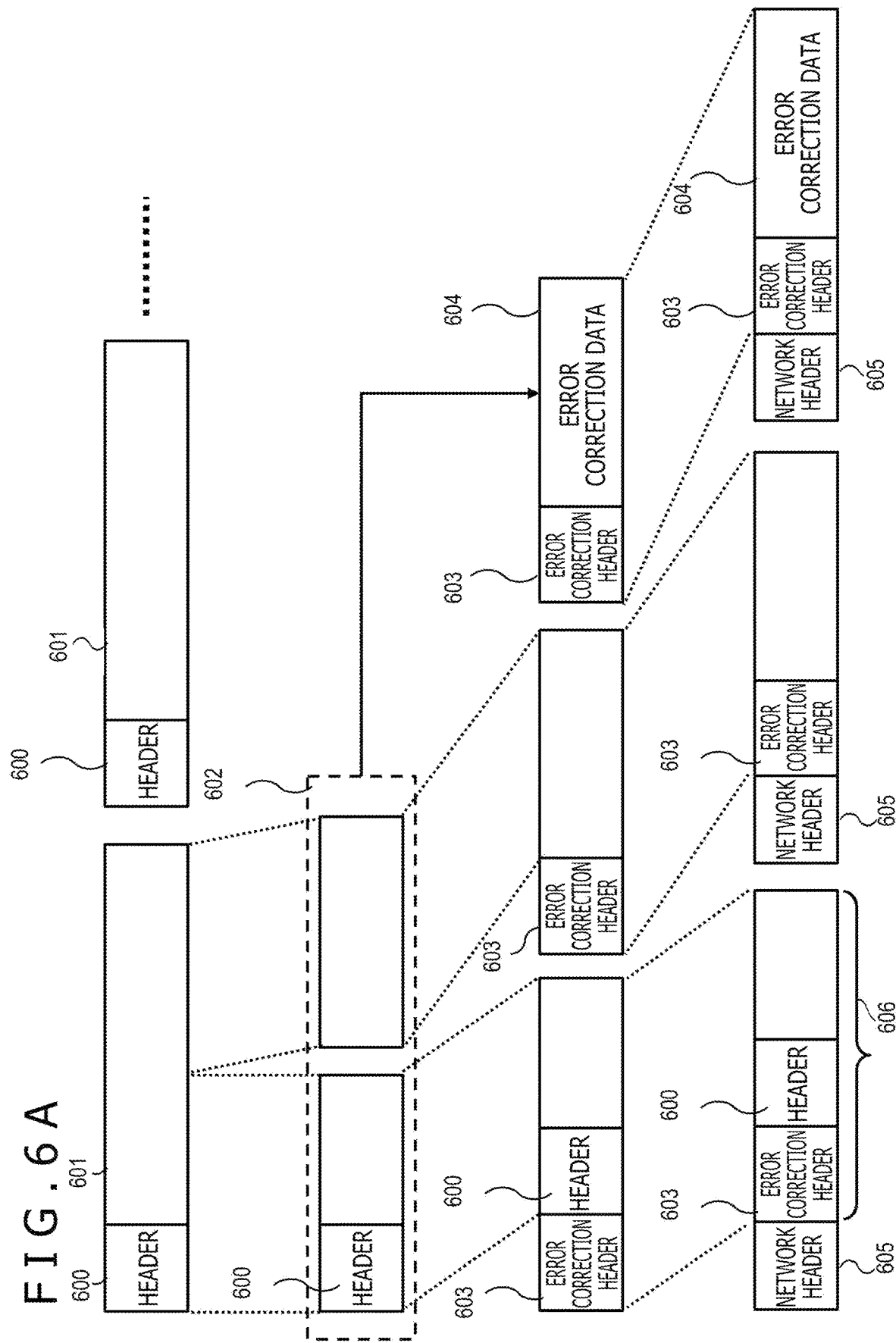

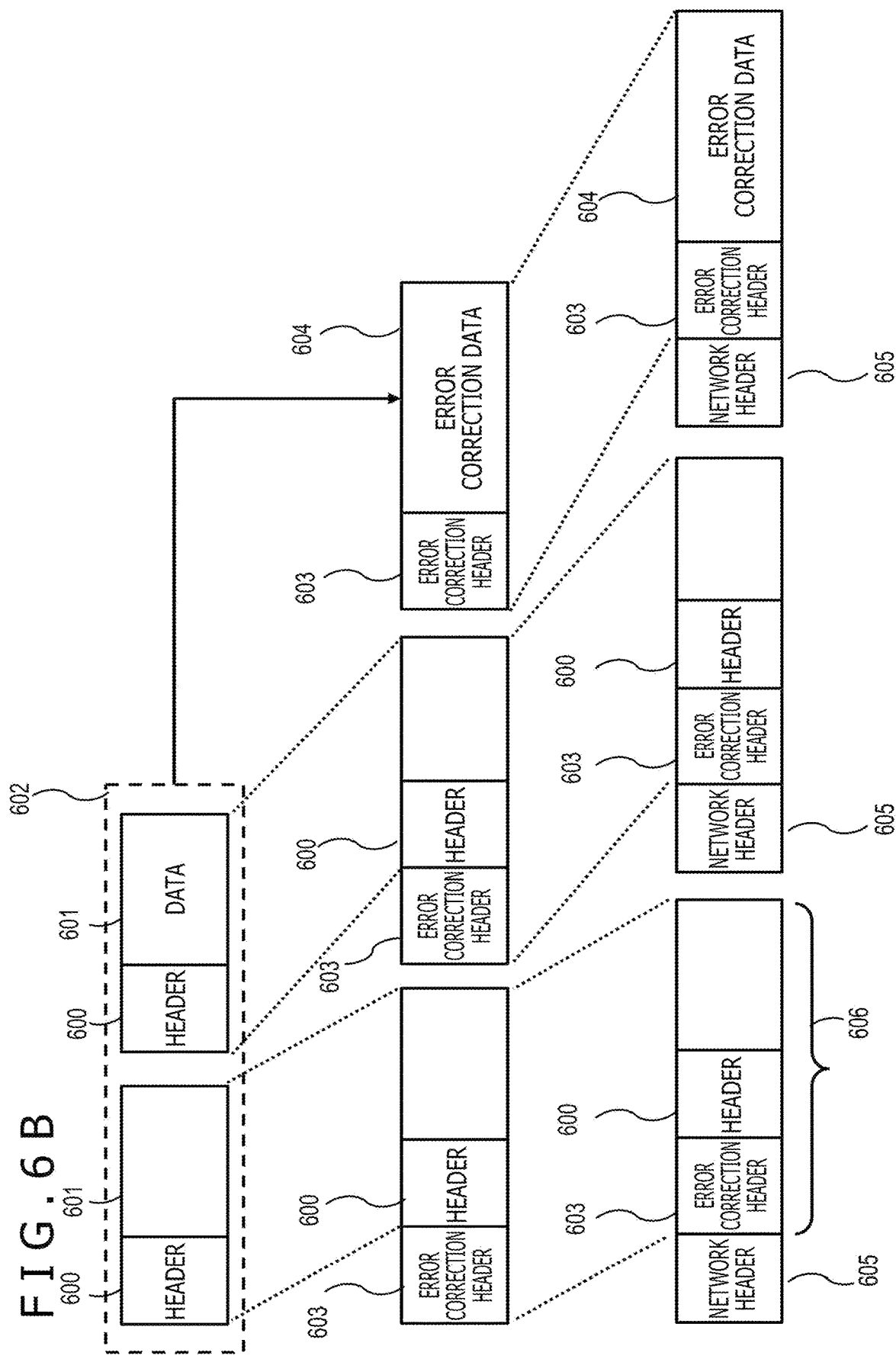

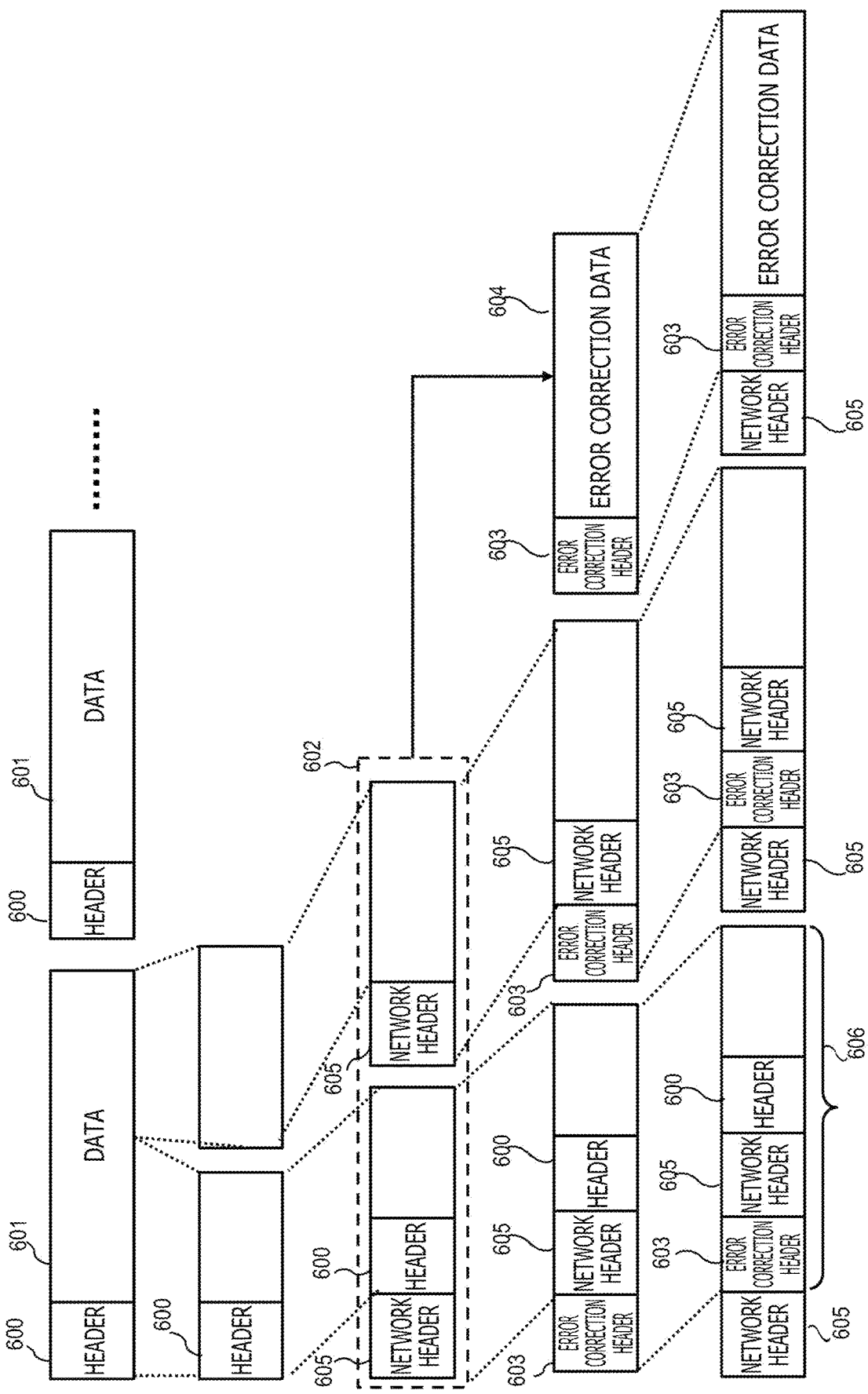

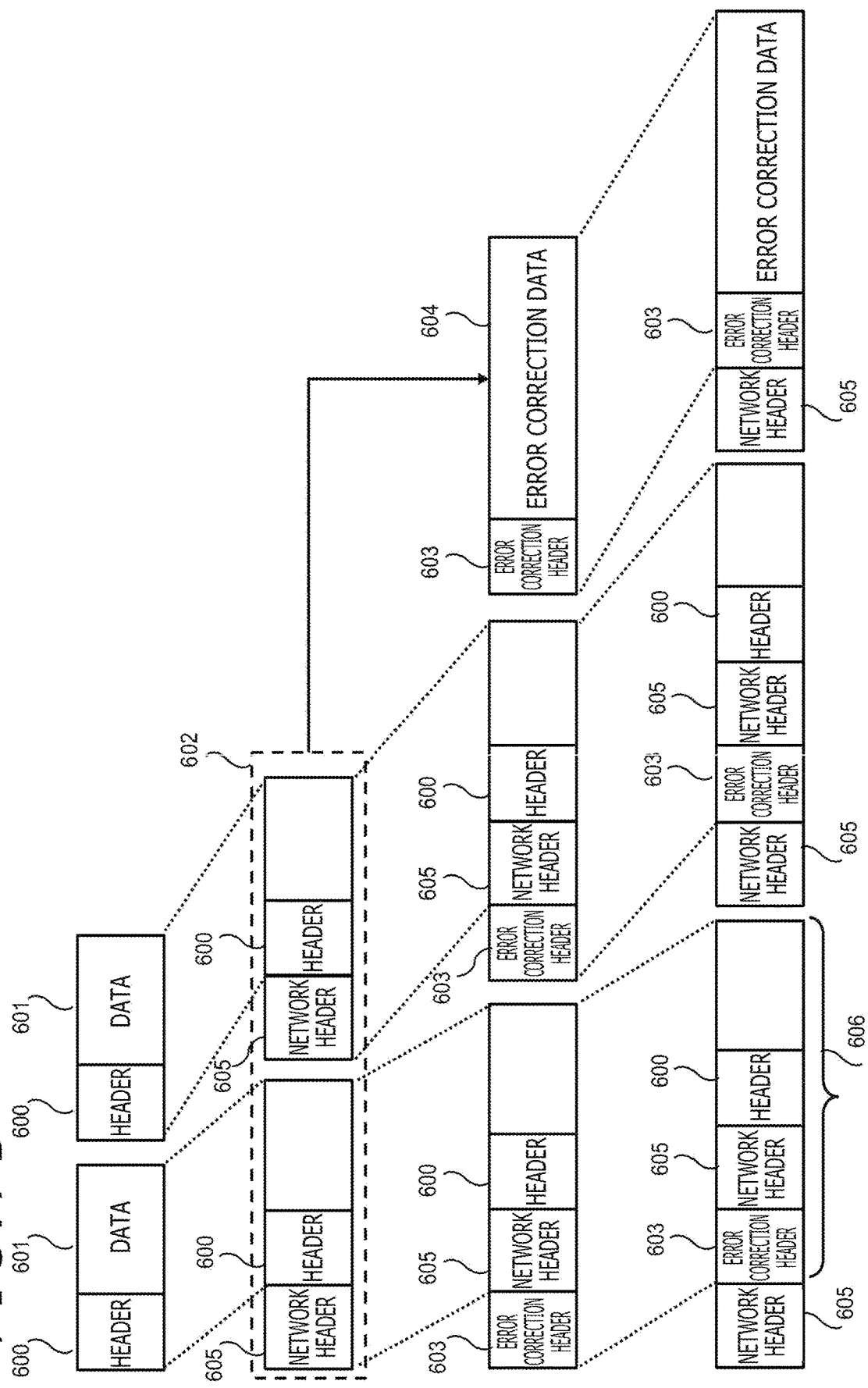

NETWORK INTERFACE FOR STORAGE CONTROLLER

CLAIM OF PRIORITY

The present application claims priority from Japanese patent application JP 2021-019731 filed on Feb. 10, 2021, the content of which are hereby incorporated by reference into this application.

BACKGROUND OF THE INVENTION

1. Field of the Invention

The present invention relates to a storage system, and a network interface for a storage controller.

2. Description of the Related Art

Information systems and storage systems are, for example, configured by a server system on which as an example a user application or the like operates, a storage controller that improves management and reliability of data that is saved, and a drive box that accommodates a plurality of drives which store and hold data used in the server system.

A storage system receives a command from a server system, and in the case of a read command, for example, the storage controller reads out data from a drive in the drive box, and transfers the data to the server system.

Conventionally, for enterprise products in particular, it is commonplace for a frontend network for a storage controller to be a fibre channel (FC) network and for a backend network to be a serial attached small computer system interface (serial attached SCSI or SAS) network. It is common to have a configuration in which a drive box is just a bunch of disks (JBOD) and slots of the drive box are mounted with a plurality of SAS/SATA (serial advanced technology attachment or serial ATA) drives that store data.

In recent years, in order to improve performance of storage systems, application of flash drives such as a solid state drive (SSD) which is a high-performance drive is progressing, the non-volatile memory express (NVMe) protocol which is optimal for accessing a flash drive has been standardized, and, for the purpose of high expandability for a drive connection in a backend network, the NVMe over Fabrics (NVMe-oF) standard that enables usage of the NVMe protocol over Internet protocol (IP) has also appeared.

In addition, views are spreading on End-to-End NVMe-oF in which NVMe-oF is also applied to a frontend network and all connections via the storage controller from the server system to the drive box are made to be NVMe-oF, drive boxes equipped with flash drives that support NVMe-oF (FBOF: fabric-attached bunch of flash) and composable storage in which a plurality of storage controllers are connected by a network have appeared, and application of IP connections in the field of enterprise storage is spreading.

In contrast, conventionally a network interface apparatus for performing communication based on IP typically has a network interface card (NIC) that processes only a physical layer or a data link layer by dedicated hardware, or a transmission control protocol offload engine (TCP offload engine or TOE) to which primarily some of a stateless portion of network protocol processing is offloaded. In contrast to this, there have been changes to network interface apparatuses, and SmartNICs are appearing. A SmartNIC incorporates a general-purpose processor and memory, causes an operating system to operate, runs software thereon, and performs network protocol processing.

In a SmartNIC, for example, it is possible to cause the same operating system as that which runs on a server system to operate. It is possible to cause a software protocol stack, applications, and the like that are used by a server system to operate on a SmartNIC. Because processing can be installed as software, quick support for a new protocol, support for a plurality of protocols, and flexible support for updates to protocol processing are possible.

With increasing numbers of IP connections, a phenomenon of packet loss, in which packets that are transmitted and received during communication are lost due to various reasons such as losses or obstacles due to high processing load or buffer overflows of network devices on a route when IP connections are used, has become a factor for increased latency and lower throughput, and is a serious problem for realization of higher performance and stable performance.

As a countermeasure for packet loss, it is typical to use a publicly known protocol that has a characteristic of an auto repeat request (ARQ) in which, when packet loss is detected on a receiving side, the packet loss is notified to a transmitting side and the transmitting side is prompted to retransmit. However, the ARQ technique increases exchanges between the transmitting side and the receiving side when transferring packets, and thus has a problem of increasing the amount of time to transfer packets and decreasing data transfer efficiency. Because network delay increases proportionally to distance, in particular there are problems for, for example, storage disaster recovery systems which require data transfer over long distances.

Meanwhile, in order to avoid worsening packet transfer efficiency due to ARQ, a method of configuring networks by devices guaranteed to be lossless is another countermeasure to packet loss. However, lossless devices have a high device cost, and there is a concern that configuring all communication paths with lossless devices will be bad from a perspective of cost-performance.

As a method of avoiding these problems, a method for countering packet loss without using retransmission or lossless devices has been disclosed. This method involves using a network repeater having a forward error correction (FEC) function that, by mixing in redundant packets with transferred packets on the transmitting side, corrects errors on the receiving side.

For example, U.S. Pat. No. 7,305,605 discloses an invention of a storage system that can restore data even in a case where packets have been lost in exchange of data between storage apparatuses compliant with the Internet small computer system interface (iSCSI) protocol that uses the FEC technique.

SUMMARY OF THE INVENTION

The problem that the present invention addresses is effectively solving packet loss in communication processing by a storage controller.

A representative example of the present disclosure is a network interface for a storage controller, the network interface including a processor and a memory that stores an instruction code to be executed by the processor. The processor executes protocol processing for transmitting and receiving packets via a network, and reproduces a first packet not received from the network, from a plurality of other received packets included in an error correction packet group same as that of the first packet.

Another representative example of the present disclosure is a storage system including a first storage controller that includes the network interface described above and a second storage controller that includes a second network interface. The network interface of the first storage controller and the second network interface transmit and receive packets via a network. The second network interface includes a processor and one or more memories configured to store an instruction code to be executed by the processor. The processor executes protocol processing for transmitting and receiving packets via the network, and reproduces a second packet not received from the network, from a plurality of other received packets included in an error correction packet group same as that of the second packet.

A further representative example of the present disclosure is a storage system including a storage controller that includes the network interface described above, and a drive box. The drive box includes a plurality of storage drives and a third network interface configured to transmit and receive packets to and from the network interface of the storage controller via the network. The third network interface includes a processor and one or more memories configured to store an instruction code to be executed by the processor. The processor executes protocol processing for transmitting and receiving packets via the network, and reproduces a third packet not received from the network, from a plurality of other received packets included in an error correction packet group same as that of the third packet.

By virtue of the representative embodiment of the present invention, it is possible to effectively solve packet loss in communication processing by a storage controller. Problems, configurations, and effects other than as described above will be clarified by the following description of embodiment.

BRIEF DESCRIPTION OF THE DRAWINGS

FIG. 6A is an explanatory view that illustrates an example of an error correction target packet (format that does not include a network header);

FIG. 6B is an explanatory view that illustrates an example of an error correction target packet (format that does not include a network header);

FIG. 7A is an explanatory view that illustrates an example of an error correction target packet (format that includes a network header);

FIG. 7B is an explanatory view that illustrates an example of an error correction target packet (format that includes a network header);

DESCRIPTION OF THE PREFERRED EMBODIMENT

Figure 1:
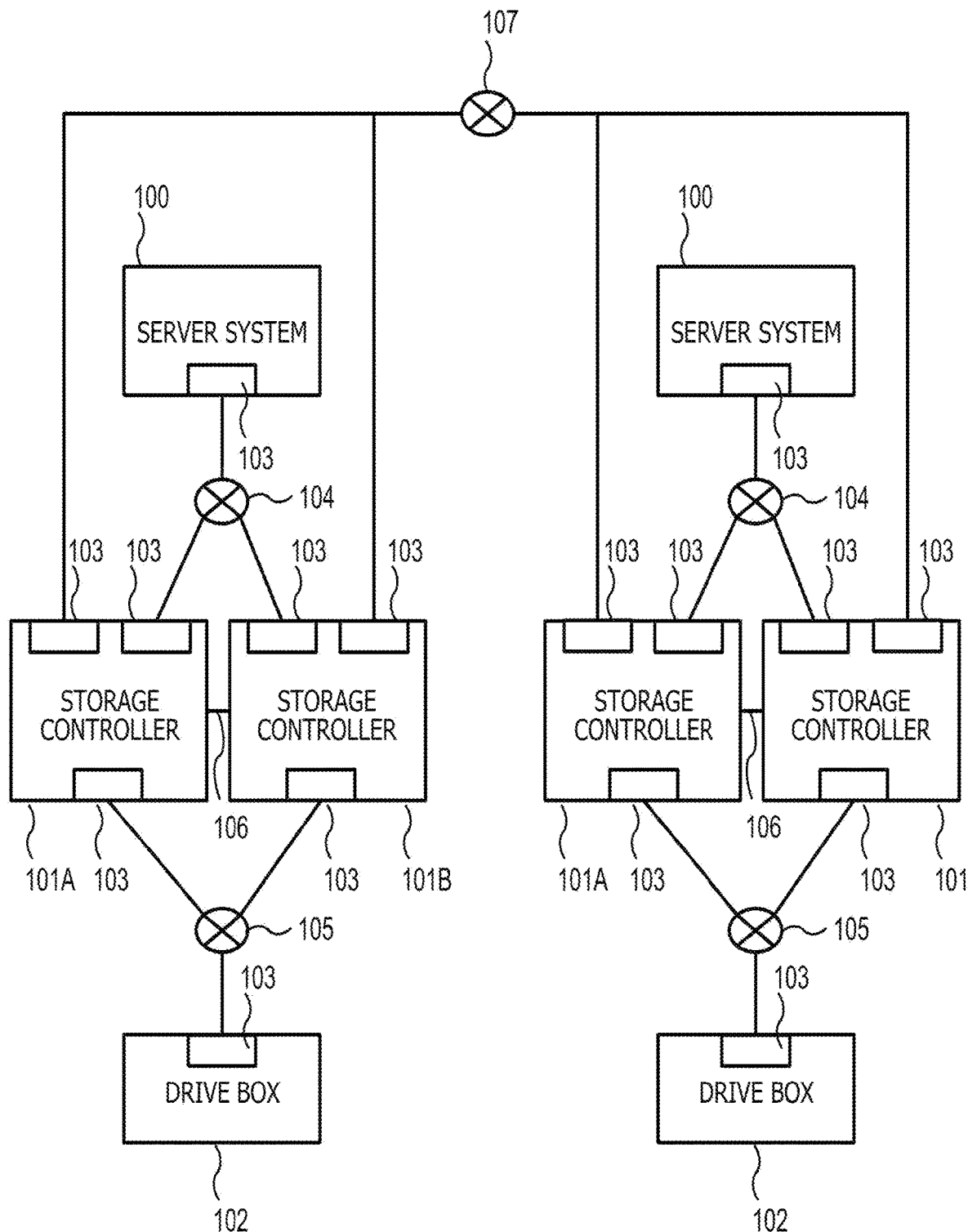
FIG. 1 is a block diagram of a storage system according to an embodiment of the present invention.

With reference to the drawings, description is given below regarding an embodiment of the present invention. Note that the following language and the drawings are examples for describing the present invention. There are abbreviations and simplifications, as appropriate, to clarify the description. The present invention can be implemented in various other forms, and each component may be singular or plural unless specified otherwise.

In addition, the embodiment described below does not limit the invention according to the claims, and there is no limitation to all combinations of elements described in the embodiment being essential to means for solving the invention.

In the following description, various pieces of information may be described by expressions such as "table," "list," and "queue," but the various pieces of information may be expressed as data structures different from these. To imply independence from a data structure, "xxx table," "xxx list," "xxx queue," and the like may be referred to as "xxx information." In the following description, expressions such as "identification information," "identifier," "name," "ID," and "number" are used when giving a description regarding identification information, but these can be mutually interchanged.

In the following description, in the case where there is a plurality of components that has the same or similar functionality, description is essentially given after applying the same reference symbol, but, even if the functionality is the same, means for realizing the functionality may be different. Furthermore, the embodiment of the present invention which is described below may be implemented by software that operates on a general-purpose computer, or may be implemented by dedicated hardware or a combination of software and hardware.

In addition, in the following description, processing may be described using a "program" as the subject, but because the program is executed by a processor (for example, a CPU: central processing unit) to perform defined processing while appropriately using a storage resource (for example, a memory) and/or an interface device (communication port) or the like, description may be given with the processor as the performer of the processing.

Processing described with a program as the subject may be processing performed by a computer (for example, a compute host or a storage apparatus) that has a processor. In addition, in the following description, the expression "controller" may indicate a processor or a hardware circuit that performs some or all of processing performed by the processor.

Programs may be installed in each computer from a program source (for example, a program distribution server or a storage medium that the computer can read). In this case, it may be that the program distribution server includes a CPU and a storage resource, the storage resource further stores a distribution program and a program which is to be distributed, and the CPU executes the distribution program, so that the CPU of the program distribution server distributes the program which is to be distributed to another computer.

In addition, in the following description, two or more programs may be realized as one program, and one program may be realized as two or more programs.

In addition, in the following description, a "storage drive" or simply a "drive" means a physical storage device, and typically may be a non-volatile storage device (for example, an auxiliary storage device). A drive may be a hard disk drive (HDD) or an SSD, for example. Different types of drives may be mixed in a storage system.

In addition, in the following description, a drive holds a VOL. "VOL" is an abbreviation of volume, and may be a physical storage device or a logical storage device. A VOL may be a real VOL (RVOL), or may be a virtual VOL (VVOL). A "RVOL" may be a VOL based on a physical storage resource (for example, one or more RAID groups) held by a storage system that holds the RVOL.

A "VVOL" may be one of an externally connected VOL (EVOL), a capacity-expanded VOL (TPVOL), and a snapshot VOL. An EVOL may be a VOL that is based on a storage space (for example, a VOL) of an external storage system, and is in accordance with storage virtualization technology. A TPVOL may be a VOL that is configured by a plurality of virtual regions (virtual storage regions) and is in accordance with a capacity virtualization technology (typically, thin provisioning).

In addition, in the following description, a VOL recognized from a host (a VOL provided to a host) is referred to as an "LDEV." In the following description, an LDEV is a TPVOL (or RVOL), and a pool is a TP pool. However, the present invention can also be applied to a storage apparatus in which a capacity expansion technology (thin provisioning) is not employed.

A "pool" is a logical storage region (for example, a set of a plurality of pool VOLs), and may be prepared for each intended use. For example, a pool may be a TP pool. A TP pool may be a storage region configured by a plurality of pages (real storage regions). In a case where a page is not allocated to a virtual region (TPVOL virtual region) to which an address designated by a write request received from an host computer (hereinafter, "host") belongs, the storage controller allocates a page from a TP pool to the virtual region (write destination virtual region) (even if a page has been allocated to the write destination virtual region, a page may be newly allocated to the write destination virtual region). A "pool VOL" may be a VOL that is a component of a pool. A pool VOL may be a RVOL or an EVOL.

In addition, in the following description, a VOL may be a "logical unit" (hereinafter, LU) for SCSI or a "name space" (hereinafter, NS) in NVMe.

In addition, in the following description, "RAID" is an abbreviation of Redundant Array of Inexpensive Disks. A RAID group is configured by a plurality of drives (typically drives of the same kind), and stores data in accordance with a RAID level associated with the RAID group. A RAID group may be referred to as a parity group. A parity group may be a RAID group that stores parity, for example.

One embodiment of the present specification solves a problem of packet loss in processing for communicating with a storage controller. In other words, the necessity of expanding installation space, increased cost, or performance degradation due to additional network devices such as a repeater, which can be an obstacle for the introduction of communication that includes error correction, are resolved. Alternatively, that it is not possible to efficiently use network bandwidth after retransmitting both a packet for which there is no response from the transmitting side and all subsequent packets, in a case where error correction could not be performed on the receiving side, is resolved. Alternatively, that hardware must be updated each time there is more support for new protocols, such as NVMe-oF as well as iSCSI, is also resolved.

A network interface apparatus according to the embodiment of the present specification can be installed in an information processing system that includes a server system and a storage system. The storage system can include a storage controller and a drive box. The network interface apparatus can include, for example, a general-purpose processor, a memory, a network controller, an assist system, an internal switch, an interface with a network, and an interface with a host system.

In the embodiment of the present specification, a network interface apparatus on a transmitting side obtains a packet transmission request from a host system of the network interface apparatus, and determines whether a transmission destination performs error correction communication. If the transmission destination performs error correction communication, a determination is made as to whether a group for error correction calculation processing has already been formed. If a group has not been formed, a group is newly created.

The network interface apparatus generates an error correction header that includes control information indicating this group, generates a network packet, and determines the number of redundant packets necessary for error correction, control of a transmission interval, and a transmission order while taking an error correction level into account. If a redundant packet is necessary, the network interface apparatus generates the redundant packet in the above-mentioned group, and transmits the redundant packet as a network packet together with normal network packets.

The network interface apparatus on the transmitting side retransmits a network packet in response to a reception response from the receiving side that error correction of the network packet was not possible. The network interface apparatus also retransmits the network packet again if there is no response for a certain amount of time.

The network interface apparatus on the receiving side receives a network packet from the transmitting side and determines whether an error correction start condition is satisfied. If the error correction start condition is satisfied, information in an error correction management table for the corresponding group is used to reproduce a network packet that is missing, and returns a response that reception of the network packet is complete to the transmitting side. If reproduction is not possible, in order for only the missing network packet to be retransmitted, a response that includes information enabling the missing network packet to be identified is created and returned to the transmitting side. If necessary, the error correction management table is updated from, for example, the status of missing packets or the like. For example, in the case of changing an error correction level or the like, notification is made to the transmitting side.

To be able to, for example, switch from iSCSI to NVMe-oF or swiftly support change due to an update of the NVMe-oF specification or change to a new protocol in communication that performs error correction if error correction processing is possible and make a retransmission request if error correction is not possible, a network interface having error correction functionality that tracks change by using a general-purpose processor, memory, or the like to support switching of software in the network interface and solves the problem of packet loss in processing for communicating with a storage controller is realized.

By implementing error correction in the network interface, unnecessary protocol conversion is omitted. As a result, it is possible to suppress degradation of communication performance, increased cost due to the addition of network devices, and increases in installation space. In addition, in accordance with a retransmission request for only missing packets for when error correction was not possible, it is possible to avoid not being able to efficiently use the network bandwidth after the transmitting side retransmits a packet for which a response did not return as well as all subsequent packets.

A configuration that uses a general-purpose processor and a memory that can realize software-based protocol processing solves the issue that hardware must be updated each time there is more support for new protocols, such as NVMe-oF as well as iSCSI. In addition, in an environment where in particular latency performance is required as in an NVMe-oF environment, it is possible to suppress an impact on performance due to increased round-trip time (RTT) due to retransmissions.

FIG. 1 illustrates an example of a configuration of an information processing system according to the embodiment. The information processing system includes one or more server systems 100 and a storage system. The storage system includes one or more storage controllers 101 and one or more drive boxes 102. Each storage controller 101 is connected to one or more server systems 100 via a frontend network 104.

Each drive box 102 is mounted with one or more drives, and is connected to one or more storage controllers 101 via a backend network 105. In addition, each storage controller 101 makes a short-range connection by an inter-storage-controller network 106, and, via an external network 107, connects to another storage controller 101 that is at a medium or long distance away.

Each server system 100 is a host machine on which a user application or the like operates, has one or more processors, and is configured by including one or more storage apparatuses such as a memory or an auxiliary storage apparatus. For example, a server system 100, on which a database or a web service operates, reads and writes, via a network interface 103, data created in accordance with this database or web service to and from the storage controller 101. In addition, each server system 100 connects to a storage controller 101 via the frontend network 104, and has a network interface 103 as an interface apparatus therefor. A server system 100 may be configured by a plurality of server groups, and each server group may have a network interface 103 and connect to a storage controller 101 or another server system 100.

In order to provide the functionality of storage to a server system 100, a storage controller 101A and a storage controller 101B configure a redundant controller. The storage controllers 101A and 101B are each provided with one or more processors and one or more storage apparatuses. The storage controller 101A and the storage controller 101B have the same configuration.

The storage controllers 101A and 101B each have one or more processors, and a core of each processor makes an instruction to transfer data stored in the corresponding drive box 102 in response to a read command or a write command from the server system 100. The memory of a storage controller 101 is configured by a semiconductor memory such as synchronous dynamic random-access memory (SDRAM), for example. The memory may be configured by a combination of volatile memory and a non-volatile memory such as storage class memory (SCM).

As the main storage for the processor, the memory stores an execution program (such as a storage control program), a management table that the processor refers to, or the like. In addition, the memory is also used as a disk cache (cache memory) for the storage controller 101. The storage controller 101 has a network interface 103 as an interface apparatus with respect to the drive box 102. The network interface 103 communicates information relating to processing that applies to storage processing, such as a data copy or a data transfer for which an instruction has been made from the server system 100, to the drive box 102.

The drive box 102 is mounted with a plurality of SSD, HDD, or other types of drives, and, in order to connect this plurality of drives with the storage controllers 101A and 101B, includes an internal switch as well as a processor and a memory that are used for transfer processing. The drive box 102 receives data generated by the server system 100 via a storage controller 101, and stores and holds this data.

In order to ensure the availability of held data, the drive box 102 may set up RAID between drives inside the drive box 102, or RAID may be set up among a plurality of drive boxes 102. In addition, the drive box 102 connects to the storage controllers 101A and 101B via the backend network 105, and has a network interface 103 as the interface apparatus for the backend network 105.

A network interface 103 is an apparatus that is mounted in each of the server system 100, the storage controllers 101A and 101B, and the drive box 102, and is an interface for connecting various devices with various networks. Error correction processing in the embodiment is executed by the network interface 103.

The network interface 103 may be a SmartNIC, for example. Various functions of the SmartNIC are implemented using a general-purpose processor and a partial hardware offload engine that are mounted in the SmartNIC. In addition, the SmartNIC may be a configuration that uses a field-programmable gate array (FPGA), and in this case, each function is realized in the FPGA. Furthermore, as another form, the entirety of the network interface 103 may be a configuration that is dedicated interface hardware on which hardware is implemented. Details of the network interface 103 are described below.

A frontend network 104 is a network that connects the storage controllers 101A and 101B with the server system 100. For example, an FC network can be used for the frontend network 104, but an IP network such as iSCSI or NVMe-oF is also used.

A backend network 105 is a network that connects a storage controller 101 with a drive box 102, and, for example, SAS or the like is used. Due to the usage of flash drives for drives inside the drive box 102, NVMe with a peripheral component interconnect (PCI)-Express connection is also used. In addition, an IP network such as NVMe-oF is also used.

An inter-storage-controller network 106 is a network that is used to make storage controllers 101 redundant, and is configured by a broadband interconnect. Using this network, for example, write data is duplicated and metadata is shared, and even if the storage controller 101A on one side is stopped due to maintenance, a failure, or the like, storage processing can be continued by the storage controller 101B on the other side.

The external network 107 is a wide area network (WAN) or a local area network (LAN), is, for example, a network for which the data link layer is Ethernet (registered trademark), the Internet layer is the Internet protocol, and the transport layer is the transmission control protocol (TCP) or the user datagram protocol (UDP), and performs communication using a protocol data unit (PDU) for iSCSI or NVMe-oF. This network can take the form of an Internet line or a dedicated line. In a case where communication delay has increased in accordance with distance and network devices are not configured by only lossless devices, although the occurrence rate differs in accordance with the type of line described above, the occurrence of packet loss is envisioned.

Note that an information system or a storage system may include something different from that described here. For example, a network device such as a switch or a router may be connected between each network and each system, and an apparatus for monitoring or maintenance may be connected to each network. In addition, there may be a configuration in which connection is made to a storage service on a public cloud, via the external network 107. In this case, there may be a configuration in which error correction communication is realized by combining a network interface 103 of a storage controller 101 and an error correction processing service of the above-mentioned storage service.

Figure 2:
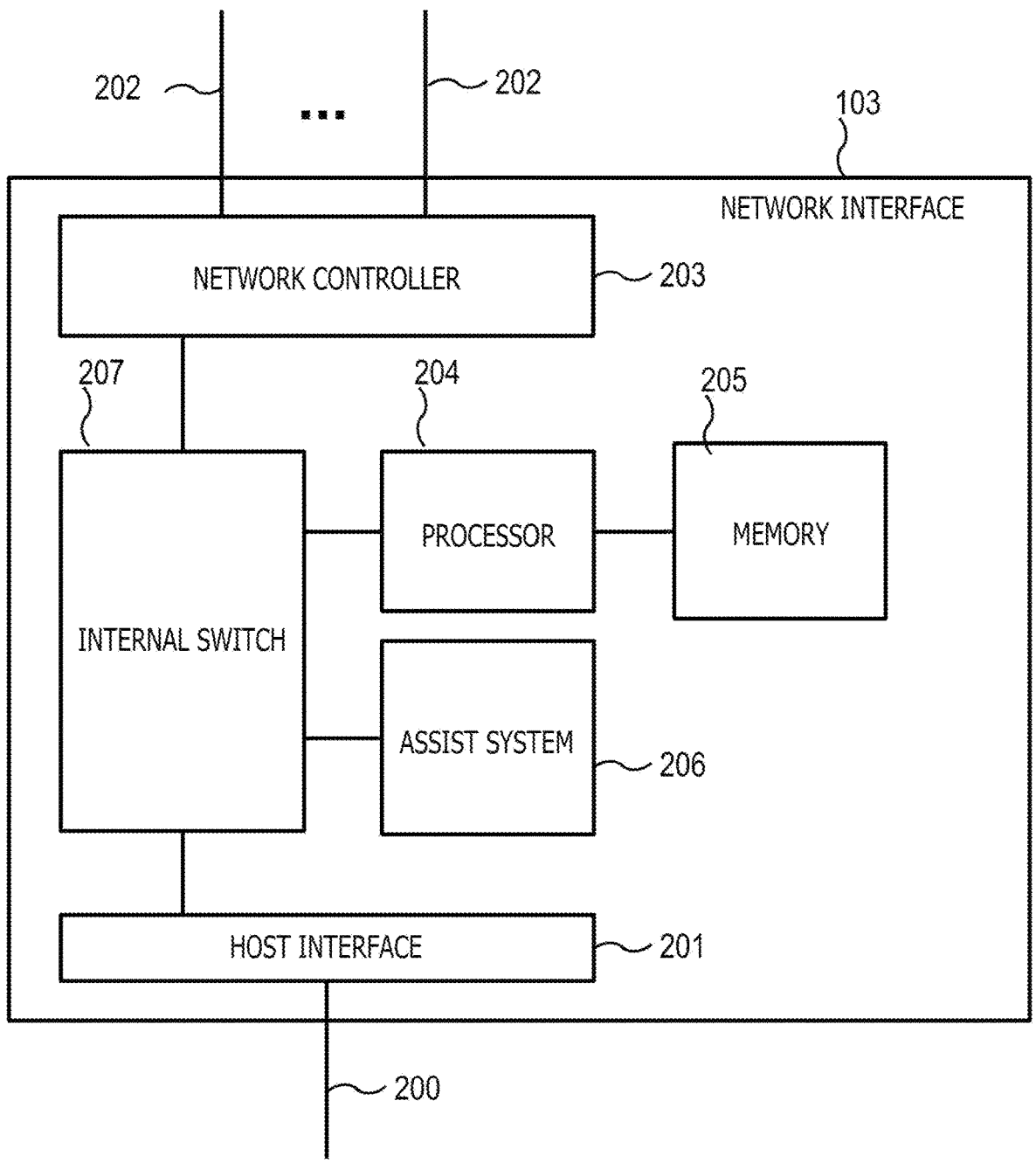
FIG. 2 is an explanatory view of a storage interface.

FIG. 2 is a view that illustrates an example of a configuration of a storage interface according to the embodiment of the present invention. A network interface 103 is connected, via a host bus 200, to a device mounted with a network interface 103, for example, a storage controller 101, a server system 100, a drive box 102, or the like. The network interface 103 connects, via a network path 202, to another device by an IP network connection, for example.

The network interface 103 includes a host interface 201 for connecting to the host bus 200, and a network controller 203 that connects to the network path 202 to perform network protocol processing. The network interface 103 also includes an internal switch 207 which connects various functions inside the network interface 103, a processor 204, a memory 205, and an assist system 206.

The host bus 200 is a bus that connects the network interface 103 to the storage controllers 101A and 101B, the server system 100, the drive box 102, and the like. The host bus 200 is a broadband high-speed interconnect, and, for example, has a configuration in which connections to a processor or the like of a mounted device are made by PCIe.

The host interface 201 is an interface for connecting the network interface 103 to a host system via the host bus 200. For example, in a case where the host bus 200 is PCIe, the host interface 201 can include PHY of PCIe, for example. The host interface 201 may be mounted with direct memory access (DMA) for exchanging data between the memory 205 in the network interface 103 and a memory in the host system.

Note that DMA which exchanges data with the memory in the host system may be mounted in the network controller 203 or the assist system 206. The host interface 201 connects to each module in the network interface 103 via the internal switch 207.

The network path 202 is, for example, a path on an IP network, and can take the form of a WAN, a LAN, or a storage area network (SAN). The network interface 103 performs communication via one network path 202 or via two or more network paths 202 in consideration of redundancy. The network path 202 can suffer packet loss if a lossless configuration is not used.

The network controller 203 is an interface for connecting the network interface 103 to the network path 202. The network controller 203, for example, executes processing for the physical layer such as PHY, and stateless processing for the data link layer, the Internet layer, and the transport layer. The network controller 203 performs checksum or frame processing, for example. The network controller 203 includes a buffer for packets that are transmitted or received, and has a DMA processing function for this buffer and each memory.

The network controller 203 supports Ethernet, IP, TCP, UDP, and the like, for example. The network controller 203 may also include an offload engine for Internet protocol security (IPsec), transport layer security (TLS), data integrity field (DIF), or the like. In addition, the network controller 203 has a configuration that supports a connection with an optical cable, a copper cable, or the like.

The processor 204 is, for example, a general-purpose processor. In the network interface 103, for example, the processor 204 causes an operating system which is also used in the server system 100 or the like to operate. The processor 204 also executes other software, and performs processing such as network protocol processing or management of the network interface 103. The processor 204 can have any configuration, and, for example, can include one or more CPUs or micro processing units (MPUs), and include one or more cores.

Network protocol processing uses an interface with the network controller 203, and, for example, executes a program such as a socket program, an iSCSI initiator or target, or an NVMe-oF initiator or target. Network protocol processing also uses an interface with the host interface 201 and performs control for the exchange of commands and data with a host. In addition, the processor 204 also controls the assist system 206, the internal switch 207, and the like which are inside the network interface 103. The processor 204 also performs the error correction processing of the present embodiment.

The memory 205 is, for example, configured by a semiconductor memory such as an SDRAM, or may be configured in combination with a non-volatile memory such as an SCM. As the main storage for the processor 204, the memory 205 stores an execution program (instruction code such as network protocol processing or error correction processing), a management table that the processor refers to, and the like. In addition, the memory 205 is also used as a buffer for commands or data transmitted to or received from the network. Furthermore, the memory 205 may be a queuing interface for the network controller 203 or the host interface 201, and store, for example, an index or descriptor for a queue.

The assist system 206 is a dedicated processing hardware offload engine and improves processing performance for the network interface 103 by offloading some processing of the processor 204. For example, the assist system 206 is configured by dedicated hardware for IPsec, TLS, DIF, cyclic redundancy check (CRC), hash calculation, parity calculation, filtering processing, compression, deduplication, or the like. The processor 204 manages and uses the assist system 206. The assist system 206 may be used from the host system.

The internal switch 207 mutually connects with each module inside the network interface 103, and can communicate with each module.

Note that an information system or a storage system may include things other than what is described here. For example, a non-volatile storage apparatus in which is stored a module or an interface for monitoring or maintenance or an operating system or a software program that operates on the network interface 103 may be added.

Figure 3:
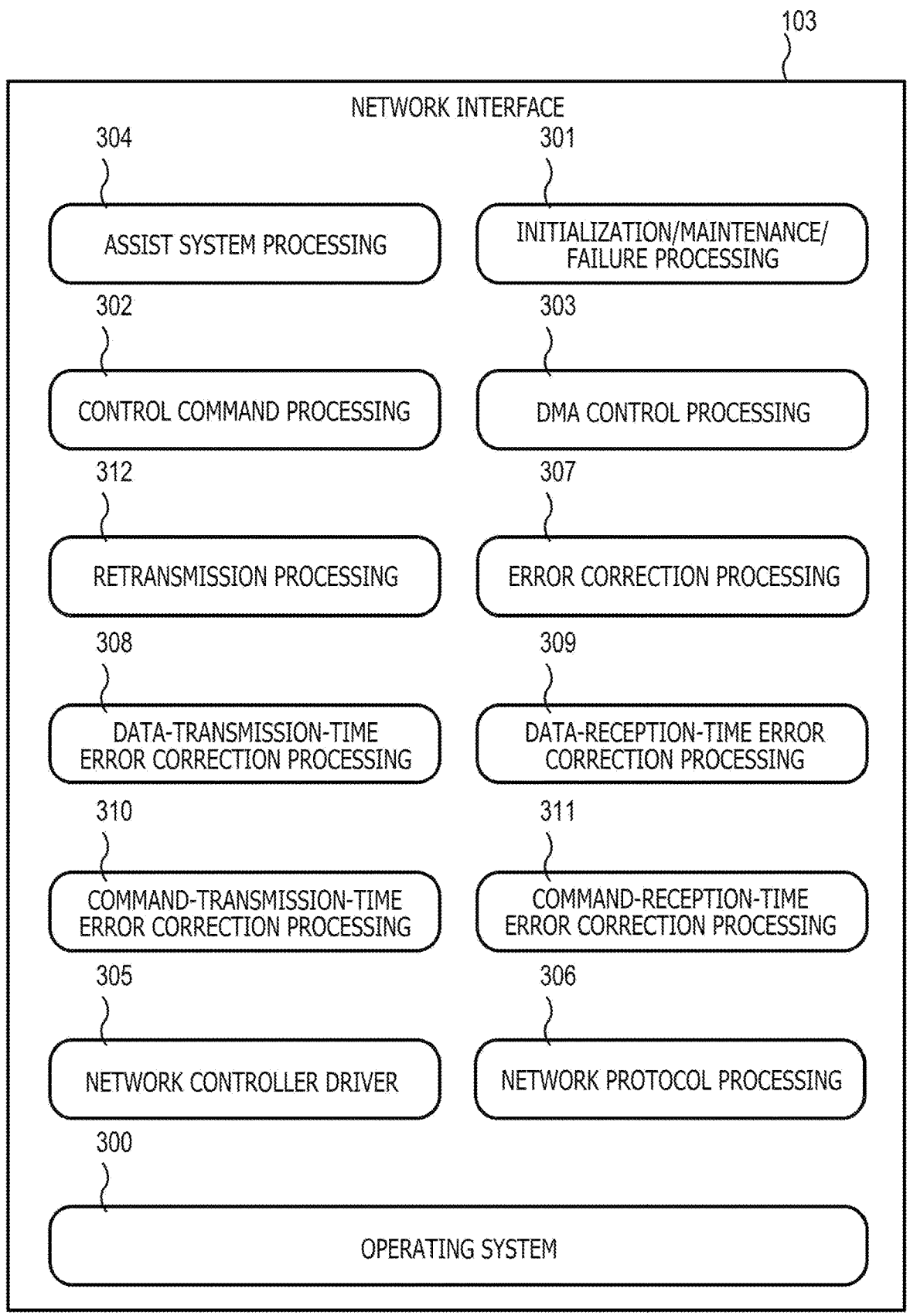
FIG. 3 is a program structure view of the storage interface.

FIG. 3 is a view that illustrates a program configuration of a storage interface according to the embodiment. At a time of network protocol processing and network communication, the network interface 103 executes error correction processing for reproducing a packet that has been lost along the way. In order to realize a software-based processing function that can be changed, the network interface 103 uses the general-purpose processor 204 and the memory 205 to cause an operating system 300 to operate, and causes software programs for various processing to operate thereon.

Software programs 300 through 312 are deployed to the memory 205 and processed by the processor 204. Note that a portion of processing for which performance by hardware is more efficient, such as DIF, CRC, cryptographic, compression, hash, or parity processing, can be implemented by the assist system 206 or various items of DMA hardware, and controlled by software.

The operating system 300 is a basic software program that is a base for causing the network interface to operate, and manages the entirety of the network interface. The operating system 300 provides a common usage environment for each item of software that operates on the processor of the network interface. The operating system 300 may be an embedded operating system, or may be a general-purpose operating system that operates on a server, such as Linux (registered trademark), for example.

Description is given below for the other programs 301 through 312. Initialization/maintenance/failure processing 301 initializes hardware that makes up the network interface 103, and performs initialization processing for various items of software. In addition, the initialization/maintenance/failure processing 301 supports software updates for the network interface 103, detection of hardware failures, notifications to the host system, or the like.

Control command processing 302 receives a command for controlling the network interface 103 from the host system, and controls the network interface 103. The control command processing 302 receives a network protocol processing request from the host system, activates network protocol processing 306, and returns a processing result from the network protocol processing 306 to the host system. In addition, in order to transfer data to a memory secured by the host system, the control command processing 302 activates DMA control processing 303 and performs response processing. Furthermore, the control command processing 302, for example, makes initial settings, changes settings, replaces software in the network interface 103, or makes a notification to the host system at a time of a failure, The DMA control processing 303, for example, performs processing for interfacing with DMA hardware in order to control the transfer of data between the memory secured on the host system side and the memory 205 in the network interface 103.

When processing for which performance by hardware is more efficient, such as DIF, CRC, cryptographic, compression, hash, or parity processing, is realized by the assist system 206, assist system processing 304 controls this hardware. The assist system 206 is a queuing interface or the like. The assist system processing 304 performs processing to generate and issue a queue descriptor for controlling the assist system 206, and harvest responses from the assist system 206.

A network controller driver 305 is driver software for controlling the network controller 203. The network controller driver 305 passes, to the network controller 203, a parameter set for packet processing that is offloaded when generating or receiving packets. The network controller driver 305 also passes a packet generated by the network protocol processing 306 to the network controller 203 and causes the network controller 203 to transmit the packet. In addition, the network controller driver 305 passes a packet received from the network controller 203 to the network protocol processing 306.

The network protocol processing 306 receives an instruction from the host system, and cooperates with the control command processing 302, the assist system processing 304, the DMA control processing 303, and the network controller driver 305 to perform processing to generate and transmit a packet. The network protocol processing 306 also performs processing for analyzing a received packet, and transfers a command or data to the host system.

For example, the network protocol processing 306 performs IP header processing for the Internet protocol layer, TCP header processing or UDP header processing for the transport layer, and iSCSI processing or NVMe-oF processing. As a result, it is possible to exchange transmission/reception data and commands with the host system or, via the network, with a counterpart system. The network protocol processing 306 also obtains information regarding obtained packets and packets that are yet to be obtained, and cooperates with error correction processing 307 and retransmission processing 312 to perform error correction processing or retransmission processing with respect to the packets that are yet to be obtained.

The error correction processing 307 receives a processing result from the network protocol processing 306, and controls error correction processing. The error correction processing 307 looks at a transmission/reception state of network packets, and performs error correction processing when necessary. The error correction processing is processing with respect to a command or processing with respect to data. The error correction processing 307 creates an error correction group.

An error correction group is configured by a plurality of items of data (user data) that is to be used when generating redundant data, and generated redundant data. Here, data associated with a command may be referred to as user data in order to make a distinction from typical data or redundant data. The error correction group is used in order to use a plurality of items of data that belong to the group to perform a calculation for generating redundant data, use a plurality of items of data belonging to the group and redundant data to perform a calculation within the group, and reproduce lost data.

For example, on the transmitting side, a plurality of items of data (user data) belonging to the group are stored in packets that are transmitted to the network. Each time a packet is transmitted, data is stored in a buffer memory, and when an amount of data in accordance with a level of redundancy is gathered, this data is used to generate redundant data, and the redundant data is also transmitted to the network. An identifier for the same error correction group is assigned to the redundant data and the data used to generate the redundant data, and error correction becomes possible on the receiving side by combining the redundant data with data or packets assigned with the error correction group identifier same as the that of the redundant data. Packets that store the same error correction group identifier make up an error correction packet group.

On the receiving side, in accordance with the identifier for the error correction group, the reception data (including redundant data) is stored in the buffer memory, and in the case where some data (user data) is missing in the error correction group with the same identifier and reproduction using the redundant data is necessary, the data (including redundant data) stored in the buffer memory is used to perform a calculation to regenerate data and reproduce the lost data.

How much redundant data to set with respect to a range for an error correction group is determined by an error correction level. An error correction level is allocated to an error correction group. An error correction level indicates an amount of data and a level of redundancy in accordance with this amount of data. For example, if there is an error correction level with a level of redundancy 2 with respect to 100 items of 8 kB data, and if the 100 items of 8 kB data are transmitted and, on the receiving side, 98 items and redundant data are received, data can be reproduced on the receiving side even if two items of data are lost.

When all data (user data) for the error correction group has been able to be received on the receiving side, including reproduction in accordance with error correction, the buffer memory relating to this data is released. For example, the buffer memory on the receiving side is released in the case where all the data has been gathered and the data will not be used even in other error correction processing. The buffer memory on the transmitting side is released in the case where the transmitting side determines in accordance with a response from the receiving side that the data transmitted has reached the receiving side and the data ceases to be used in other error processing. Note that, when error correction is not possible, the error correction processing 307 decides to perform retransmission processing.

Data-transmission-time error correction processing 308 manages an error correction header that includes control information used by the receiving side at a time of error correction, and a group of redundant data application ranges for error correction. The data-transmission-time error correction processing 308 performs error correction processing in accordance with an error correction algorithm, in the group. A level of redundancy is decided in accordance with the error correction level, and redundant data corresponding to this level of redundancy is generated and transmitted as network packets. As a result, even if a network packet that includes transmission data is lost on the network route, reproduction on the receiving side is possible in accordance with error correction processing.

When a network packet that includes reception data is lost on a network route, data-reception-time error correction processing 309 uses redundant data and error correction header information of network packets already received to reproduce the lost network packet. The error correction level for discriminating an error correction algorithm for the reproduction and whether error correction is possible is determined in advance in cooperation with the transmitting side, and managed in an error correction management table.

If error correction is possible, processing for reproduction is performed in accordance with the redundant data and network packets that are already received, and the network packet is reproduced. Note that, even if a network packet did not actually get lost on the network route but arrival of the network packet was delayed, it may be that, if an error correction condition is met, error correction is performed, and the network packet that arrives late is discarded. As a result, even if the network environment is not good, data transfer can be performed efficiently.

When setting up a plurality of connections, an error correction group may be set among packets for these connections. For example, in command transmission and the like, there are cases where an initiator transmits data after a target side has requested the initiator side for data transmission with ready to transfer (R2T), in response to a command issued by the initiator side. In a case where error correction is set for commands in one connection in order to handle loss of the command from the initiator, there will be one redundant command with respect to one command. By setting an error correction group among commands for a plurality of connections with the same destination, it is possible to generate one item of redundant data for a plurality of commands, and it is possible to realize efficient error correction communication.

Command-transmission-time error correction processing 310 manages an error correction header that includes control information used by the receiving side at a time of error correction, and a group of redundant data application ranges for error correction. The command-transmission-time error correction processing 310 performs error correction processing in accordance with an error correction algorithm, in the group. A level of redundancy is decided in accordance with the error correction level, and redundant data corresponding to this level of redundancy is generated and transmitted as network packets. As a result, even if a network packet that includes a transmission command is lost on the network route, reproduction on the receiving side is possible in accordance with error correction processing.

In command transmission, in addition to configuring an error correction group with data from the same connection, an error correction group may include data from different connections. For example, in network communication between a primary site and a secondary site that have a disaster recovery configuration, there are cases where commands are periodically transmitted on a plurality of connections.

An error correction group is created among this plurality of connections, and an error correction algorithm is applied to this error correction group. A level of redundancy in accordance with the error correction level is decided, and redundant packets are generated and transmitted. By using information of a plurality of connections, even with a low number of commands in a connection, more appropriate error correction becomes possible by including commands among the plurality of connections in one group.

When a network packet that includes a reception command is lost on a network route, command-reception-time error correction processing 311 uses redundant data and error correction header information of network packets already received to reproduce the lost network packet. The error correction level for discriminating an error correction algorithm for the reproduction and whether error correction is possible is determined in advance in cooperation with the transmitting side, and managed in an error correction management table.

If error correction is possible, the command-reception-time error correction processing 311 performs processing for reproduction in accordance with the redundant data and network packets that are already received, and reproduces the network packet. Note that, even if a network packet did not actually get lost on the network route but arrival of the network packet was delayed, it may be that, if an error correction condition is met, error correction is performed, and the network packet that arrives late is discarded. As a result, even if the network environment is not good, data transfer can be performed efficiently.

In command reception, in addition to configuring an error correction group with data from the same connection, an error correction group may include data from different connections. For example, in network communication between a primary site and a secondary site that have a disaster recovery configuration, there are cases where commands are periodically transmitted on a plurality of connections. An error correction group for among this plurality of connections may be created. By using information of a plurality of connections, even with a low number of commands in a connection, more appropriate error correction becomes possible by including commands among the plurality of connections in one group.

In a case where error correction processing on the receiving side is not possible, or in a case where a packet for which error correction processing is not applied is lost, retransmission processing 312 generates a response packet requesting retransmission of only the lost packet, and returns the response packet to the transmitting side. Going from the received response packet, the transmitting side retransmits only the lost packet. In this manner, by responding with information regarding lost packets, there ceases to be retransmission of data that has already been received, and it is possible to efficiently use network bandwidth.

In addition, the retransmission processing 312 envisions a case in which the response packet from the receiving side is lost and not able to be received by the transmitting side, sets a retransmission timer on the transmitting side, and retransmits again a packet for which there is no response returned in the case where no response is made in a certain amount of time. As a result, even if network packets are lost on a network route, in accordance with error correction and retransmission of only lost portions, it is possible to suppress the frequency of occurrence of retransmission, and transmit and receive network packets while efficiently using network bandwidth.

Figure 4:
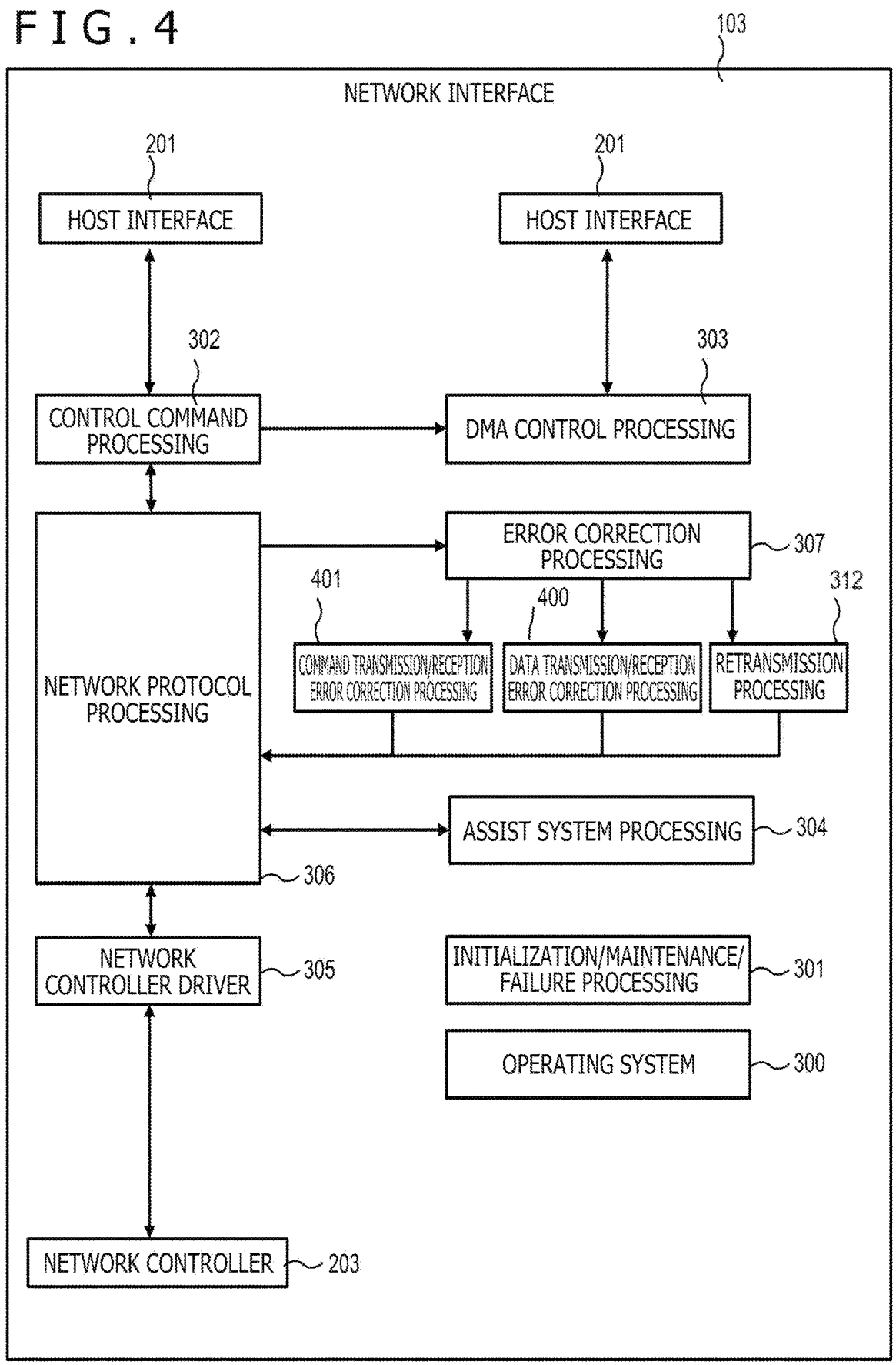
FIG. 4 is an explanatory view that illustrates an example of a relation between programs of the storage interface.

FIG. 4 is a view that illustrates an example of a relation between programs of the storage interface illustrated in FIG. 3. In the network interface 103, the operating system 300 operates, and each software program operates by using the operating system 300 as a base. In addition, by the initialization/maintenance/failure processing 301, the network interface 103 executes, for example, initial setting, maintenance such as software updates, and failure processing. Failure processing includes, for example, failure detection and collection of dump trace information such as error information and statistic information.

The control command processing 302 of the network interface 103 controls the host interface 201, and exchanges transmission commands and reception commands, for example, iSCSI or NVMe-oF commands, for network communication with the host system. A queue interface is used to exchange a command with the host system.

In accordance with a result from the network protocol processing 306, the control command processing 302 generates a descriptor format that the host system can process, and stores the descriptor format in a queue. In addition, the control command processing 302 obtains a descriptor generated by the host system from the queue, and sets and uses various functions within the network interface 103, such as the network protocol processing 306. Note that descriptors, data, or the like from the queue are exchanged by the host system and the network interface 103 using DMA in accordance with the DMA control processing 303.

The network controller driver 305 controls the network controller 203, stores a transmission packet in a packet buffer of the network controller 203, and obtains a received packet from the packet buffer. In addition, the network controller driver 305 also performs settings for offloading frame processing for the data link layer, the Internet protocol layer, and the transport layer, as well as stateless processing, for example, checksum calculations.

Receiving an operation from the network controller driver 305, the network protocol processing 306 performs network protocol processing such as for IP, TCP, UDP, iSCSI PDU processing, or NVMe-oF PDU processing. Note that processing for the address resolution protocol (ARP), the Internet control message protocol (ICMP), or the like, or processing for IP version 4 or version 6 may be performed. In addition, a protocol for the transport layer may be a protocol such as quick UDP Internet connections (QUIC), in addition to TCP or UDP.

The network protocol processing 306, using a processed result, cooperates with the control command processing 302, and performs an exchange for network communication with the host system. At this time, parts of the network protocol processing 306 for which processing by dedicated hardware is more efficient, for example, checksum or digest calculations, encryption processing, compression, deduplication processing, hash or parity processing, may be subject to a hardware offload to the assist system 206 via the assist system processing 304 and performed.

Meanwhile, at a time of network transmission, the network protocol processing 306 and the error correction processing 307 cooperate to apply error correction processing to transmission packets as necessary. The error correction processing 307 determines whether a target of transmission is a command or data. In the case of data, data transmission/reception error correction processing 400 performs error correction processing among data packets that are to be transmitted, and assigns an error correction header. The network protocol processing 306 performs network protocol processing and transmits the packets.

In the case of a command, command transmission/reception error correction processing 401 performs error correction processing among a plurality of command packets to transmit and among a plurality of connections with the same destination, and assigns an error correction header. The network protocol processing 306 performs network protocol processing and transmits the packets. Note that error correction processing among a plurality of connections may also be performed in the case of data, and may be performed for the same connection in the case of command transmission. When both data and commands are present, error correction processing may be applied by taking the data and commands together as an error correction group.

The error correction processing 307 determines whether a received packet is a command or data. In the case of data, the data transmission/reception error correction processing 400 performs error correction processing among data packets that have been received. In the case of a command, the command transmission/reception error correction processing 401 performs error correction processing among received command packets and among a plurality of connections. Note that error correction processing among a plurality of connections may also be performed in the case of data. Error correction processing may be performed for commands with the same connection. When both data and commands are present, error correction processing may be applied by taking the data and commands together as an error correction group.

In a case where a determination result by the error correction processing 307 indicates that error correction processing cannot be performed, retransmission processing 312 is executed. The retransmission processing 312 on the receiving side returns a response to the transmitting side, asking for the retransmission of only a packet that could not be received. Meanwhile, the transmitting side retransmits the packet if there is no response within a certain amount of time.

Figure 5:
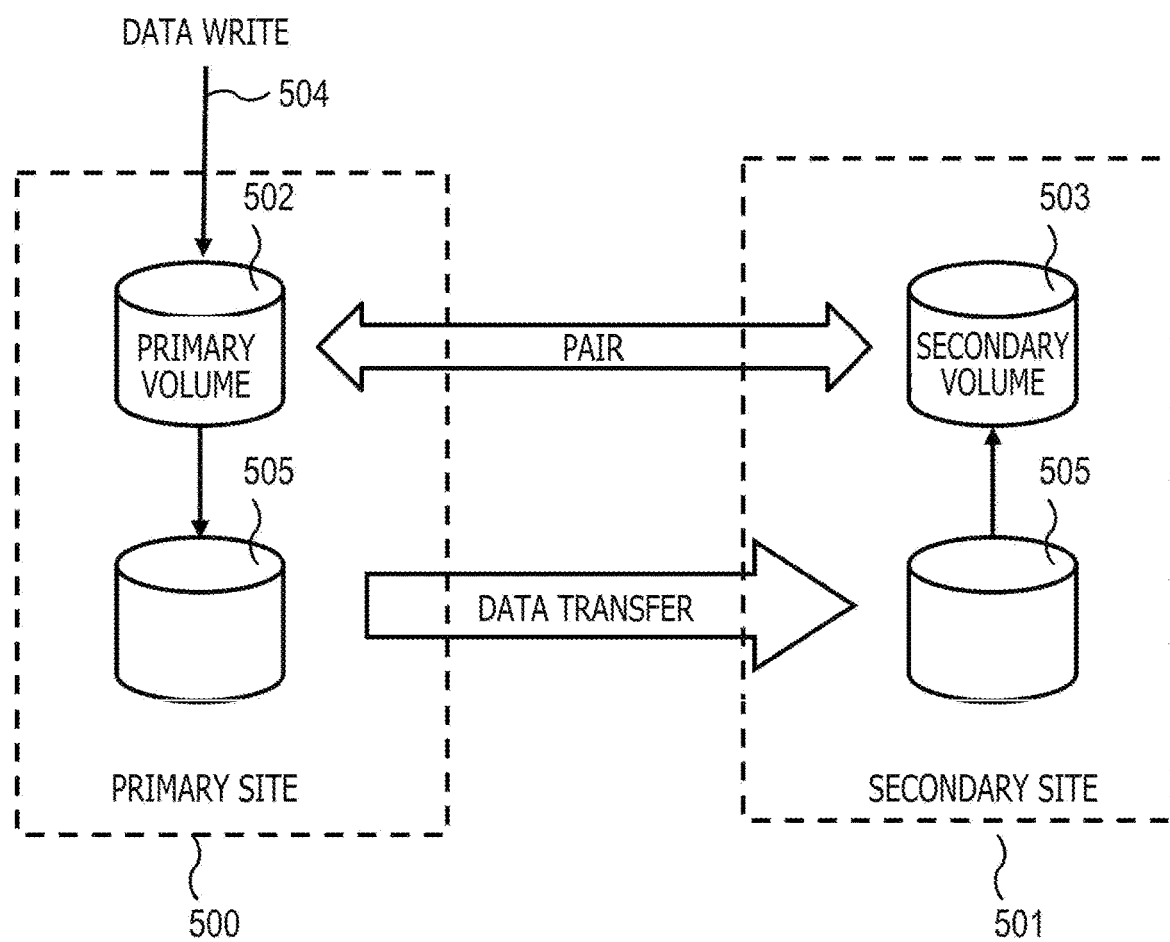
FIG. 5 is an explanatory view of a remote copy system.

FIG. 5 is an explanatory view for a remote copy system according to the embodiment. Description is given regarding a case in which error correction processing in network communication is used in, for example, a remote copy in disaster recovery of a storage system. A configuration that enables disaster recovery is configured by a primary site 500 and a secondary site 501. A data write 504 with respect to a primary volume 502 of the primary site 500 is reflected to a secondary volume 503 of the paired secondary site 501. Even when the primary volume 502 of the primary site 500 suffers a failure such as a device malfunction or when the primary site 500 itself stops due to a disaster or the like, it is possible to use data by switching to the secondary volume 503 of the secondary site 501 and thus business continuity becomes possible.

With respect to the data write 504 to the primary volume 502, the remote copy system generates a copy 505, and performs a data transfer of the copy 505 to the secondary site 501. A remote copy method may be a snapshot-based remote copy, or may be a journal-based remote copy.

A snapshot-based remote copy first transfers the entirety of the primary volume 502 to the secondary site 501 to form the copy 505, and thus configure the secondary volume 503. Subsequently, only changes due to a new data write 504 to the primary volume 502 are accumulated in the copy 505, and differences are transferred. A journal-based remote copy copies the data write 504 unchanged as journal information, and subjects the journal information to a data transfer.

Note that a remote copy does not need to be a data transfer to the secondary site 501 that is triggered on the primary site 500 side. Data from the primary site 500 side may be periodically obtained by the secondary site 501 side. The primary site 500 and the secondary site 501 can have an active-active configuration or an active-standby configuration.

In a remote copy with the above-mentioned disaster recovery configuration, the primary site 500 and the secondary site 501 are connected by the external network 107. For the external network 107, a configuration that uses a WAN can be considered when the primary site 500 and the secondary site 501 are separated by a large distance, for example.

In a case where a WAN is used, the possibility of packet loss increases because other communication is also performed in parallel. At this time, the greater the distance that separates the primary site 500 and the secondary site 501, the greater the performance impact and the greater the round-trip time for a retransmission request there are for retransfers when a network packet that is to be transmitted and received is lost. In addition, when all packets are retransmitted due to a retransmission timer in a network in which packet loss has occurred, the bandwidth is stressed and performance is impacted.

In such an environment, when the error correction processing of the embodiment is applied, it is possible to reduce the round trip time for retransmission, and thus it is possible to use the network with high efficiency.

Description is given for an example of error correction processing. In the above-described method in which the secondary site 501 side periodically obtains data from the primary site 500 side, the secondary site 501 periodically reads journal data from the primary site 500. This data read is performed by setting up a plurality of connections to achieve a wide bandwidth and increase data transfer performance and availability. In the error correction processing, commands and data on this plurality of connections are respectively grouped into error correction groups among the plurality of connections, and the error correction processing is executed. As a result, it is possible to effectively apply error correction even to a single command, for example.

FIGS. 6A and 6B are explanatory views (formats that do not include network headers) that illustrate an example of an error correction target packet according to the embodiment. Both of FIGS. 6A and 6B illustrate an example in which an error correction target 602 is designated in relation to an iSCSI or NVMe-oF PDU, for example. In FIG. 6A, the error correction target 602 is a group of a single header 600 and data 601. In FIG. 6B, the error correction target 602 is a group of a plurality of headers 600 and data 601.

The header 600 is, for example, a PDU header in iSCSI or NVMe-oF, and the data 601 corresponds to a payload. In network communication, if division of the PDU is necessary in alignment with the size of a maximum transmission unit (MTU) of the network route, transmission is performed after division of the PDU.

In the example of FIG. 6A, with respect to the divided PDU, an error correction group that indicates an error correction target 602 is set, the level of redundancy is decided in accordance with the error correction level, and an error correction header 603 is assigned. Error correction data 604 is generated in alignment with the level of redundancy, and an error correction header 603 is assigned thereto. The error correction header 603 is described below. A portion created as above is set as a network payload 606, a network header 605 is assigned thereto, and the network payload 606 with the network header 605 assigned thereto is transmitted.

In the example of FIG. 6B, with respect a plurality of PDUs, in other words, a plurality of groups of a header 600 and data 601, an error correction group that indicates an error correction target 602 is set, the level of redundancy is decided in accordance with the error correction level, and an error correction header 603 is assigned. Error correction data 604 is generated in alignment with the level of redundancy, and an error correction header 603 is assigned thereto. The error correction header 603 is described below. A portion created as above is set as a network payload 606, a network header 605 is assigned thereto, and the network payload 606 with the network header 605 assigned thereto is transmitted.

By setting a group of a header 600 and data 601 as an error correction target 602 as described above, it is possible to apply error correction processing without adding a network header 605. As a result, it is possible to reduce a processing load for network headers at a time of transmission and reception.

Note that the network header 605 is assumed to be Ethernet (registered trademark) for the data link layer, IPv4 for the Internet protocol layer, and TCP or UDP for the transport layer, for example. Note that, in the case of using TCP, measures in accordance with error correction processing may be performed with respect to a retransmission determination or response processing.

FIGS. 7A and 7B are explanatory views (formats that include a network header) that illustrate an example of an error correction target packet according to the embodiment. FIGS. 7A and 7B illustrate examples in which a packet to which the network header 605 is assigned is designated as an error correction target 602. In FIG. 7A, the error correction target 602 is a group of a single header 600, data 601, and network headers 605. In FIG. 7B, the error correction target 602 is a group of a plurality of headers 600, data 601, and network headers 605.

The header 600 is, for example, a PDU header in iSCSI or NVMe-oF, and the data 601 corresponds to a payload. In network communication, if division of the PDU is necessary in alignment with the size of an MTU of the network route, transmission is performed after division of the PDU. In the present example, an error correction target 602 is set to something resulting from assigning a network header 605 to a group of a header 600 and data 601.

In the example of FIG. 7A, a group of a single header 600 and data 601 is divided, and a network header 605 is applied to each divided portion. With respect to these divided portions, an error correction group that indicates an error correction target 602 is set, the level of redundancy is decided in accordance with the error correction level, and an error correction header 603 is assigned. Error correction data 604 is generated in alignment with the level of redundancy, and an error correction header 603 is assigned thereto. The error correction header 603 is described below. A portion created as above is set as a network payload 606, a network header 605 is assigned thereto, and the network payload 606 with the network header 605 assigned thereto is transmitted.

In the example of FIG. 7B, a network header 605 is applied to each of a plurality of groups of a header 600 and data 601. With respect to these groups, an error correction group that indicates an error correction target 602 is set, the level of redundancy is decided in accordance with the error correction level, and an error correction header 603 is assigned. Error correction data 604 is generated in alignment with the level of redundancy, and an error correction header 603 is assigned thereto. The error correction header 603 is described below. A portion created as above is set as a network payload 606, a network header 605 is assigned thereto, and the network payload 606 with the network header 605 assigned thereto is transmitted.

By setting a result of applying a network header 605 as described above as an error correction target 602 and further reassigning a network header 605 to this error correction target 602, it is possible to apply error correction processing while reducing the impact on existing network processing. Note that the network header 605 is assumed to be Ethernet (registered trademark) for the data link layer, IPv4 for the Internet protocol layer, and TCP or UDP for the transport layer, for example.

It may be that the network interface 103 holds user settable management information that designates a packet configuration for an error correction target, and decides the packet configuration for an error correction target in accordance with this management information. Specifically, the management information can designate, as an error correction target, a packet configuration that does not include a network header or a packet configuration that includes a network header.

Figure 8:
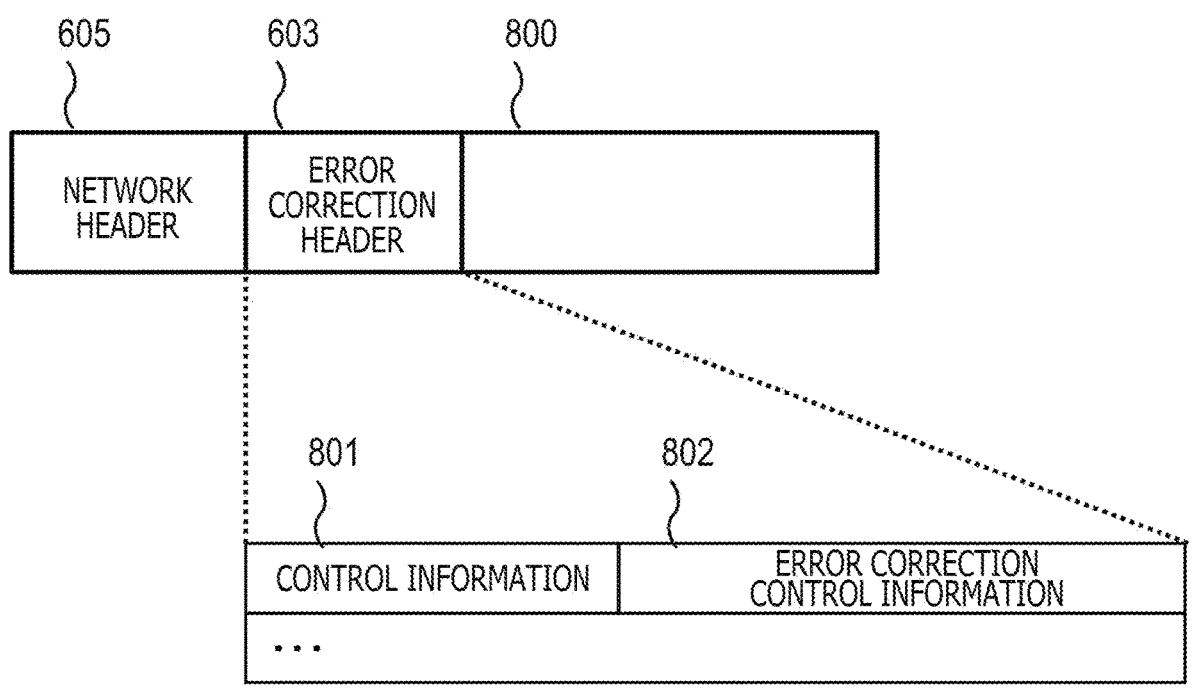
FIG. 8 is an explanatory view that illustrates an example of an error correction header.

FIG. 8 is an explanatory view that illustrates an example of an error correction header according to the embodiment. A network packet that can be subject to error correction processing is configured from a network header 605, an error correction header 603, and an error correction payload 800.

The error correction header 603 includes, for example, control information 801 and error correction control information 802. The control information 801 includes version information, an opcode, a header length, a payload length, next header information, or the like. The version information indicates a corresponding version of error correction processing that is supported by the error correction header 603. The opcode indicates a type: whether the error correction header 603 pertains to redundant data, or whether the error correction header 603 pertains to an update of an error correction management table. The header length indicates the length of the error correction header 603. The payload length indicates the length of the error correction payload 800. The next header information indicates the protocol type of the next header.

The error correction control information 802 indicates, for example, a group number that indicates a data range including redundant data to which error correction processing can be applied, a sequence number in the group, an algorithm type for the error correction processing, and an error correction processing level that indicates the level of redundancy of the error correction processing. Note that the algorithm type for the error correction processing and the level of redundancy of the error correction processing may be supported only in network packets exchanged when updating an error correction management table, and do not need to be included in packets for the transmission and reception of commands or data.

Figure 9:
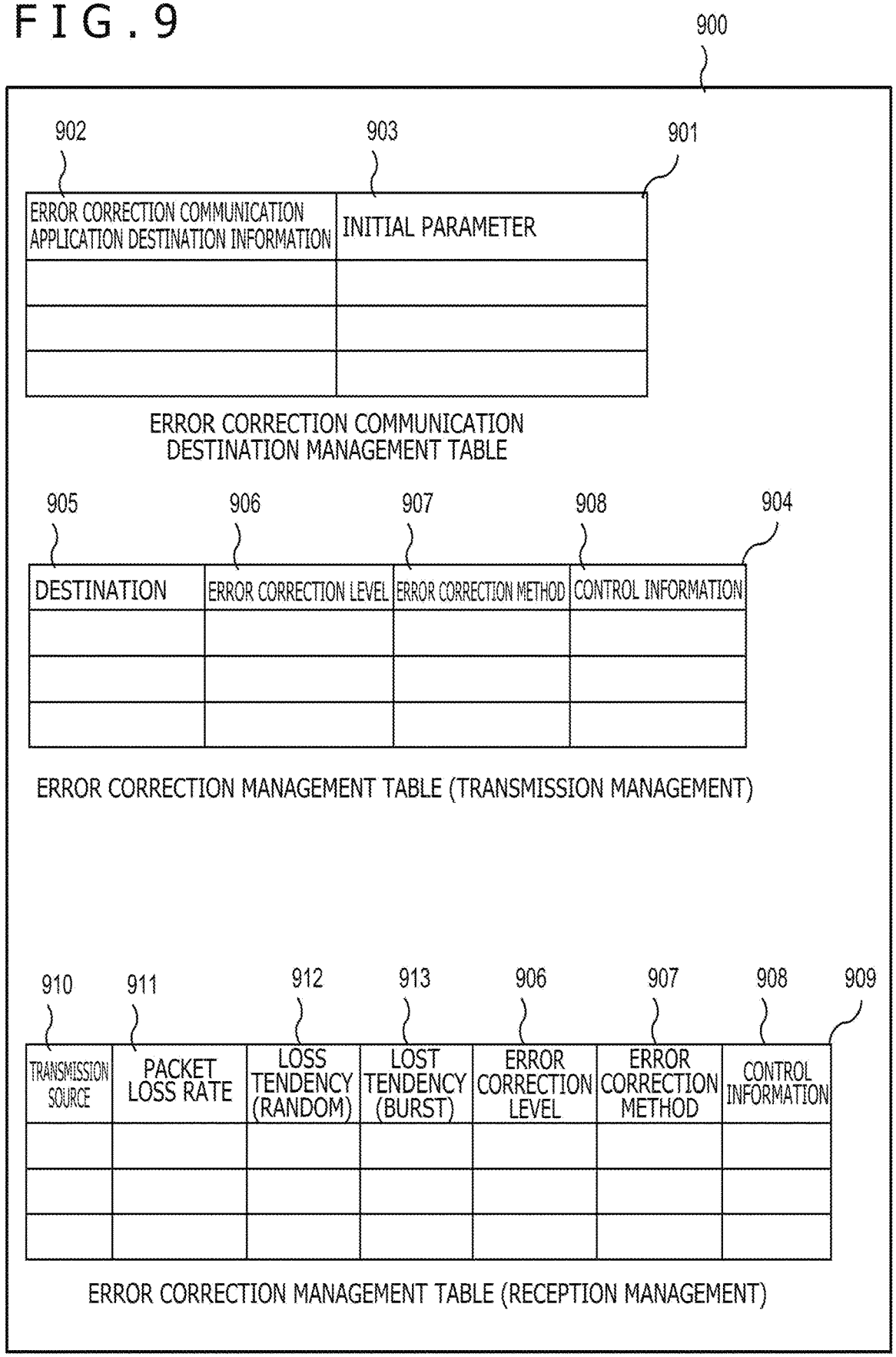
FIG. 9 is an explanatory view of an example of information registered to an error correction management table.

FIG. 9 is an explanatory view of an example of information registered to an error correction management table according to the embodiment. Error correction management information 900 is a table for managing information pertaining to error correction processing. The error correction management information 900 is managed in the memory 205 in the network interface 103, and is processed by the processor 204. The error correction management information 900 includes a plurality of tables 901, 904, and 909.

An error correction communication destination management table 901 is a table in which whether to apply error correction processing is set. The error correction processing 307 performs error correction processing based on settings in the table 901. The error correction communication destination management table 901 is set from the host system. An operator may set the error correction communication destination management table 901 from a management screen, a command line setting, or the like.

The error correction communication destination management table 901 includes error correction communication application destination information 902 and an initial parameter 903, for example. The error correction communication application destination information 902, for example, registers an identifier of a connection destination that performs error correction communication. The identifier, for example, may be an iSCSI qualified name (IQN) or an NVMe qualified name (NQN), or may be a combination of an IP address and a port number.

The initial parameter 903 sets, with respect to error correction processing with the connection destination, an initial value for which error correction algorithm to use, an error correction level for at which frequency to transfer redundant data, or the like. In addition, the initial parameter 903 may be set with an operation in the case where error correction is not possible. For example, in the case where error correction is not possible, whether to retransmit only a portion lost from the receiving side, retransmit all portions after a lost portion, or retransmit after setting a timer on the transmitting side without performing a response to a retransmission request is set.

In addition, the initial parameter 903 may be set to an initial value such as a retransmission timer value or the number of retries. Furthermore, the initial parameter 903 of this table may store, as a measured value, information regarding, for example, an error correction algorithm or an error correction level that is changed in accordance with a communication status after error correction communication is performed. A field designating a selection of whether to use an initial setting or whether to use a measured value at the time of the next connection may be held. The initial parameter 903 may designate a configuration of a packet that is an error correction target. A packet configuration that does not include a network header as described with reference to FIGS. 6A and 6B or a packet configuration that does include a network header as described with reference to FIGS. 7A and 7B may be designated as an error correction target.

An error correction management table (transmission management) 904 is a table for managing and setting information pertaining to error correction processing on the transmitting side. The data-transmission-time error correction processing 308 performs error correction transmission processing based on settings in this table. This table 904 is generated when a negotiation using the error correction communication destination management table 901 is performed. The table information may be deleted after the table contents are reflected to the error correction communication destination management table 901 together with the end of a connection, or may be held as a cache together with the end of a connection and may continue to be held as long as the amount of cache permits.

The error correction management table (transmission management) 904 includes, for example, a destination 905, an error correction level 906, an error correction method 907, and control information 908. The destination 905 indicates, for example, an IP address, a port number, an IQN, or an NQN for the receiving side. The error correction level 906 is used to determine how much redundant data to use in error correction processing. For example, a definition such as level 1 being 1 packet for 100 packets, level 2 being 10 packets for 100 packets, and so on is set.

The error correction method 907 designates an algorithm for error correction processing. The control information 908 includes, for example, information on a timer for when retransmitting a packet from the transmitting side, or designation of an error correction target 602 such as whether to perform error correction processing with another connection.

An error correction management table (reception management) 909 is a table for managing and setting information pertaining to error correction processing on the receiving side. The data-reception-time error correction processing 309 performs error correction reception processing based on settings in this table. This table 909 is generated when a negotiation using the error correction communication destination management table 901 is performed. The table information may be deleted after the table contents are reflected to the error correction communication destination management table 901 together with the end of a connection, or may be held as a cache together with the end of a connection and may continue to be held as long as the amount of cache permits.

The error correction management table (reception management) 909 includes, for example, a transmission source 910, a packet loss rate 911, a loss tendency (random) 912, a loss tendency (burst) 913, an error correction level 906, an error correction method 907, and control information 908. The transmission source 910 indicates, for example, an IP address, a port number, an IQN, or an NQN for the transmitting side.

A method of calculating the packet loss rate 911 depends on a design. For example, when a condition for performing error correction processing is met, the packet loss rate 911 is calculated from how many packets are lost in the error correction group. A packet subject to a retransmission request is included in lost packets. The packet loss rate 911 may store an average value of packet loss rate in a past error correction group, for example.

Alternatively, the packet lost rate 911 may be calculated from how many packets are lost with respect to the number of packets that are transmitted and received. The packet loss rate 911 may indicate a long-term continuous loss rate and a most recent loss rate over a shorter period of time, for example, a loss rate in communication with a predetermined number of connections or a predetermined number of error correction groups.

With respect to the packet loss rate 911, with what tendency packet loss is occurring is stored in the loss tendency (random) 912 and the loss tendency (burst) 913. For example, a numerical value for the loss tendency (random) 912 is increased in a case where only one packet is lost, and a numerical value for the loss tendency (burst) 913 is increased when packets are consecutively lost.

For the error correction level 906, although the value set in advance in the error correction communication destination management table 901 is used, the error correction level 906 is changed based on the packet loss rate 911, for example, and used. At what timing to make a change is designated by the control information 908 or the like. For the error correction method 907, although the value set in advance in the error correction communication destination management table 901 is used, for example, the error correction method 907 is adjusted by, based on the tendencies for the loss tendency (random) 912 and the loss tendency (burst) 913, selecting an optimal algorithm for whichever has the higher frequency. The control information 908 includes, for example, an information on a timer for when returning a response, or designation of an error correction target 602 such as whether to perform error correction processing with another connection.

The error correction management table (reception management) 909 may also store the number of retransmissions of a packet from the transmission source. The number of packet retransmissions may indicate the number of retransmissions in accordance with the current error correction level, for example. As described below, the error correction level can be updated in accordance with the communication status.

Figure 10:
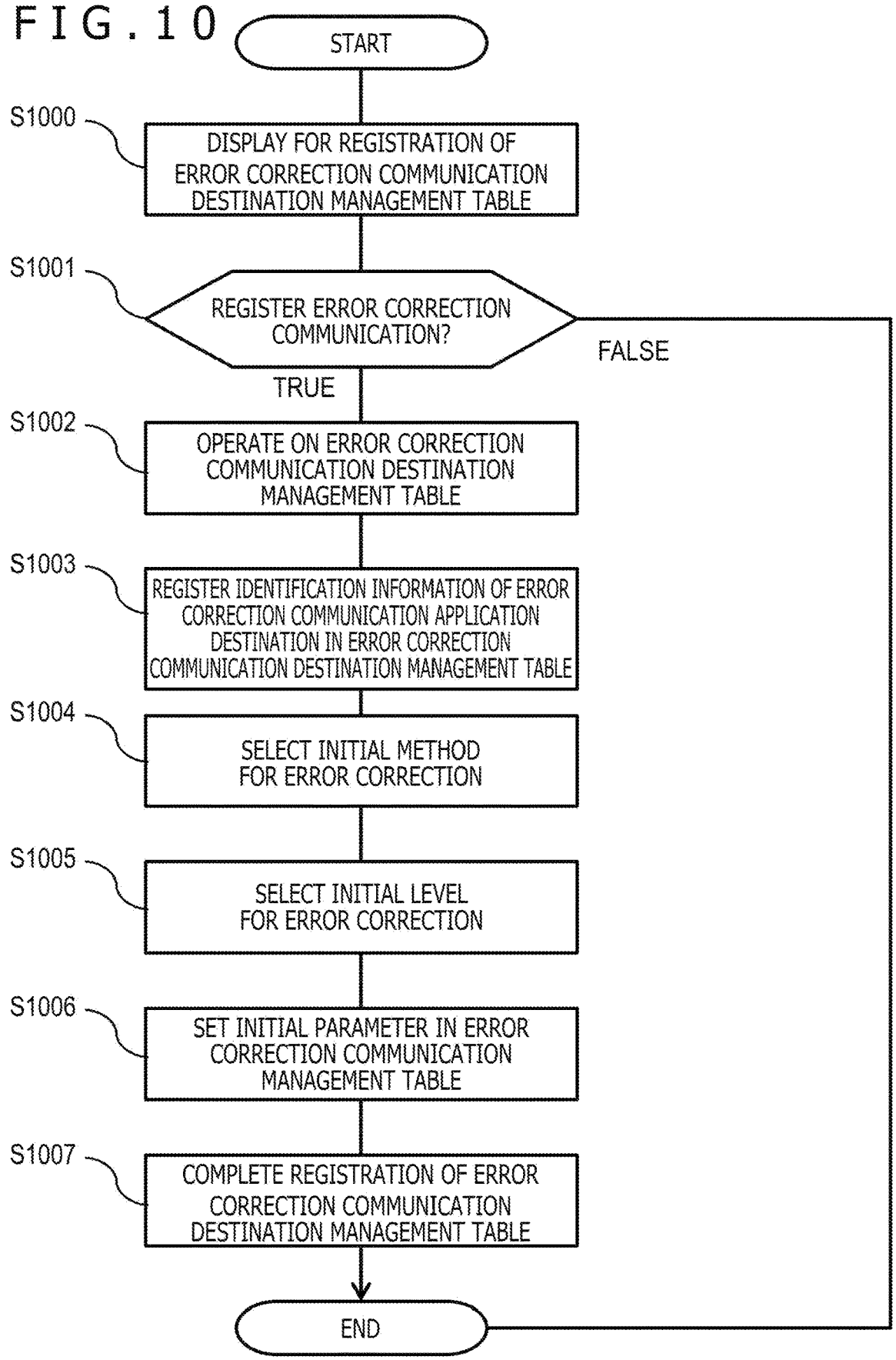
FIG. 10 is a flow chart for describing error correction communication registration.

FIG. 10 illustrates a flow chart for describing error correction communication registration according to the embodiment. In order for the network interface 103 to be able to perform error correction processing, the initialization/maintenance/failure processing 301 performs a registration display of the error correction communication destination management table 901 (step S1000). The display may be a graphical user interface (GUI) management screen of a management apparatus, or may be displayed by a character user interface (CUI) from a host system or the like.

The initialization/maintenance/failure processing 301 determines, in accordance with an instruction from an operator, whether to register error correction communication. In the case of not registering, the processing ends (step S1001: FALSE). Meanwhile, in the case of registering (step S1001: TRUE), the initialization/maintenance/failure processing 301, in accordance with an instruction from an operator, operates on the error correction communication destination management table 901 (step S1002).

As the operation on the error correction communication destination management table 901, identification information of an error correction communication application destination is registered (step S1003), an initial method for error correction is selected (step S1004), and an initial level for error correction is selected (step S1005). The initial parameter 903 is set (step S1006). Note that the value that is set is assumed to be an item that was described previously. Finally, the registration completes (step S1007). By this flow, work for registering error correction communication destination management table 901 described above is performed, and a state in which the error correction processing can be performed is configured.

Figure 11:
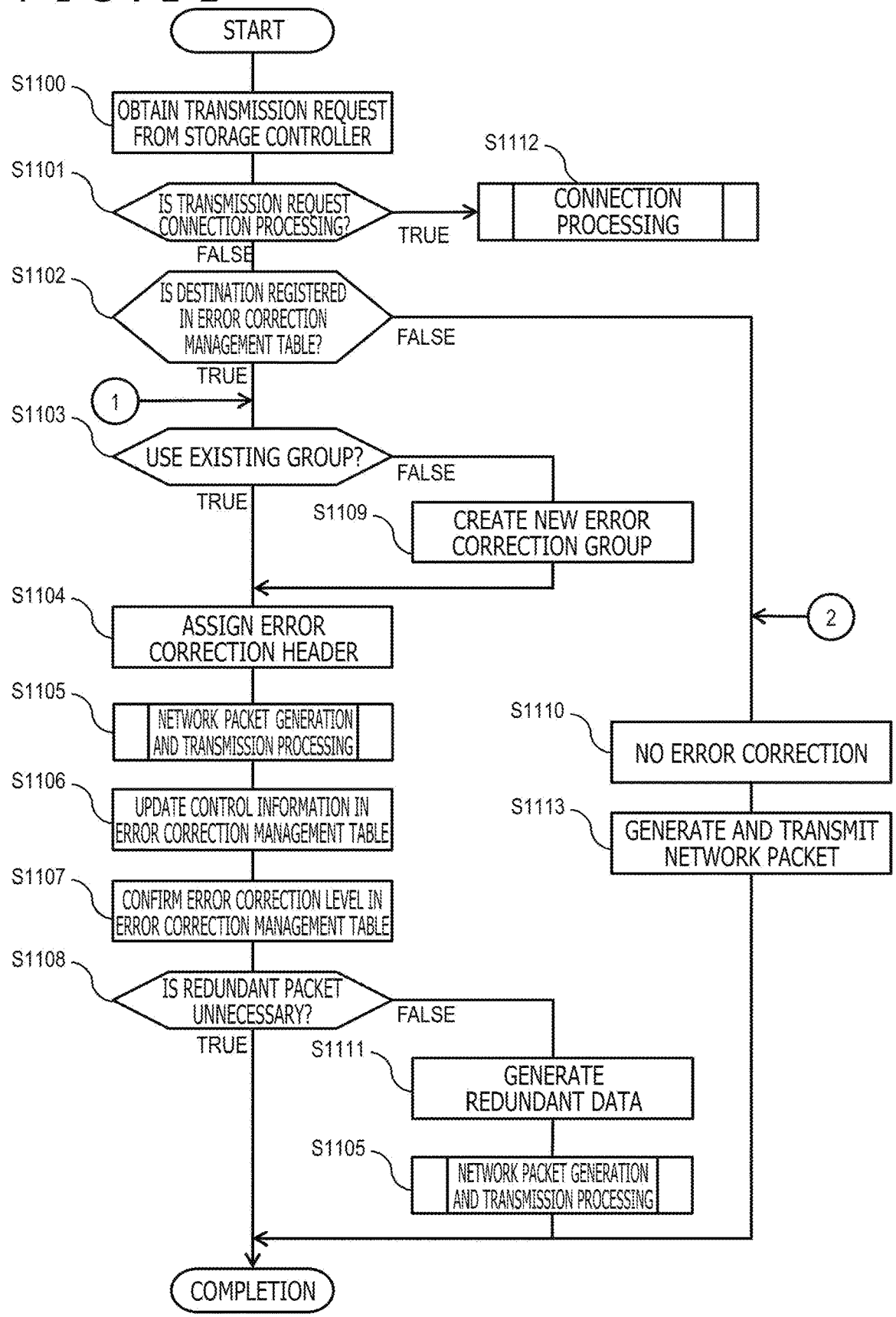
FIG. 11 is a flow chart for describing error correction processing operation at a time of data transmission.

FIG. 11 is a flow chart for describing error correction processing operation at a time of data transmission, according to the embodiment. The network interface 103 obtains a transmission request from the storage controller 101 (step S1100). The transmission request may be start of transmission with respect to a read request from the server system 100, start of transmission from the storage controller 101 to the drive box 102, or start of transmission of a remote copy from the storage controller 101 to the storage controller 101 of another site via the external network 107.

Next, the control command processing 302 determines whether the transmission request is connection processing (step S1101). In the case of connection processing (step S1101: TRUE), the error correction processing 307 executes connection processing (step S1112). Description is given below regarding connection processing (step S1112).

In a case where the transmission request is not connection processing (step S1101: FALSE), the control command processing 302 determines whether the destination is registered in the error correction management table (transmission management) 904 (step S1102). In the case where the destination is registered (step S1102: TRUE), the network interface 103 performs transmission processing for the network packet, for which error correction processing is possible. If the destination is not registered (step S1102: FALSE), the network protocol processing 306, without error correction (step S1110), performs transmission processing for the network packet (step S1113).

In the case where the destination is registered (step S1102: TRUE), the error correction processing 307 determines whether an error correction group for managing the range of error correction processing is already registered (step S1103). In the case where an error correction group is not registered (step S1103: FALSE), the error correction processing 307 newly creates an error correction group (step S1109). At this point, in order to calculate redundant data, the error correction group manages a buffer memory for managing transmission packets relating to the error correction group, or storage destination address information of transmission packets relating to the error correction group.

If an error correction group is already registered (step S1103: TRUE), the error correction processing 307 decides the use of the existing group. The data-transmission-time error correction processing 308 or the command-transmission-time error correction processing 310 assigns an error correction header to the transmission packet (step S1104). The network protocol processing 306 performs network packet generation and transmission processing (step S1105). The network packet generation and transmission processing is described below.

The data-transmission-time error correction processing 308 or the command-transmission-time error correction processing 310 updates control information in the error correction management table (transmission management) 904 (step S1106). The data-transmission-time error correction processing 308 or the command-transmission-time error correction processing 310 confirms the error correction level (step S1107), and determines whether a redundant packet is unnecessary (step S1108).

In the case where a redundant packet is unnecessary (step S1108: TRUE), the network packet transmission completes. Meanwhile, in a case where a redundant packet is necessary (step S1108: FALSE), the data-transmission-time error correction processing 308 or the command-transmission-time error correction processing 310 generates redundant data in accordance with the error correction group (step S1111). The network protocol processing 306 performs network packet generation and transmission processing (step S1105), and completes the network packet transmission. By this flow, a network packet that can be subject to error correction processing is transmitted.

Figure 12:
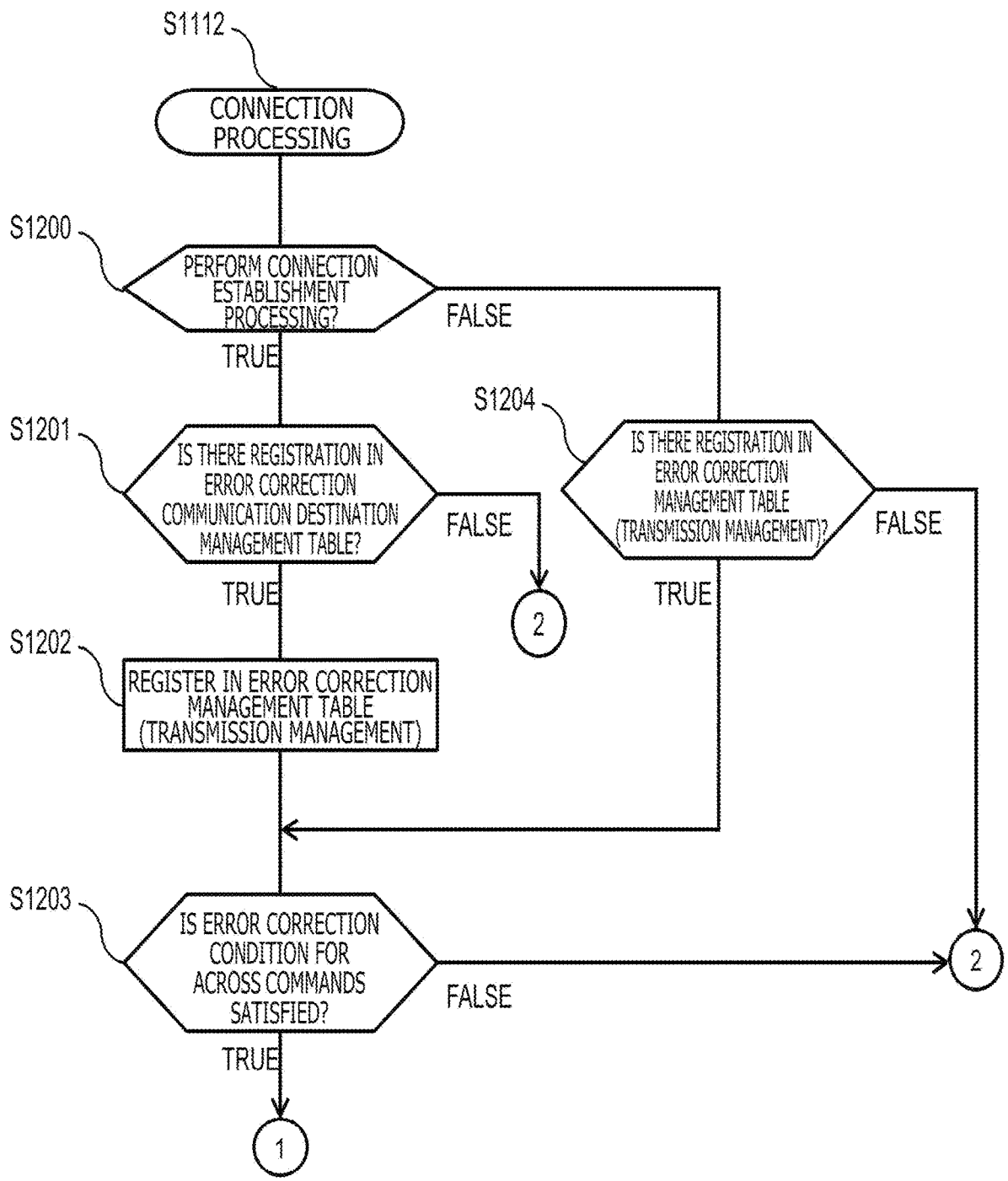
FIG. 12 is a flow chart for describing error correction processing operation at a time of transmission of a connection processing command.

FIG. 12 illustrates a flow chart for describing error correction processing operation at a time of transmission of a connection processing command, according to the embodiment. In the connection processing, the error correction processing 307 determines whether to perform connection establishment processing (step S1200). In the case of performing connection establishment processing (step S1200: TRUE), the error correction processing 307 determines whether registration has been made to the error correction communication destination management table 901 (step S1201).

In the case where registration has been made (step S1201: TRUE), the error correction processing 307 performs registration to the error correction management table (transmission management) 904 (step S1202). In the case where the error correction management table (transmission management) 904 is present as a cache, a decision is made as to whether to newly create the error correction management table (transmission management) 904 or use the cache. In the case where there is no registration (step S1201: FALSE), the network interface 103 performs the processing from the connector 2 in FIG. 11.

In addition, the error correction processing 307 determines whether an error correction condition for across commands is satisfied (step S1203). In the case where the error correction condition for across commands is satisfied (step S1203: TRUE), the network interface 103 performs the processing from the connector 1 in FIG. 11. In the case where the error correction condition for across commands is not satisfied (step S1203: FALSE), the network interface 103 performs the processing from the connector 2 in FIG. 11.

Meanwhile, in the case of not performing connection establishment processing (step S1200: FALSE), the error correction processing 307 determines whether registration has been made to the error correction management table (transmission management) 904 (step S1204). In the case where there is no registration (step S1204: FALSE), the processing from the connector 2 in FIG. 11 is performed. In the case where there is registration (step S1204: TRUE), a determination is made as to whether the error correction condition for across commands is satisfied (step S1203). In the case where the error correction condition for across commands is satisfied (step S1203: TRUE), the network interface 103 performs the processing from the connector 1 in FIG. 11. In the case where the error correction condition for across commands is not satisfied (step S1203: FALSE), the network interface 103 performs the processing from the connector 2 in FIG. 11.

By this flow, a relation between connection establishment and error correction processing is indicated, and determinations are made as to whether to generate various error correction management tables.

Figure 13:
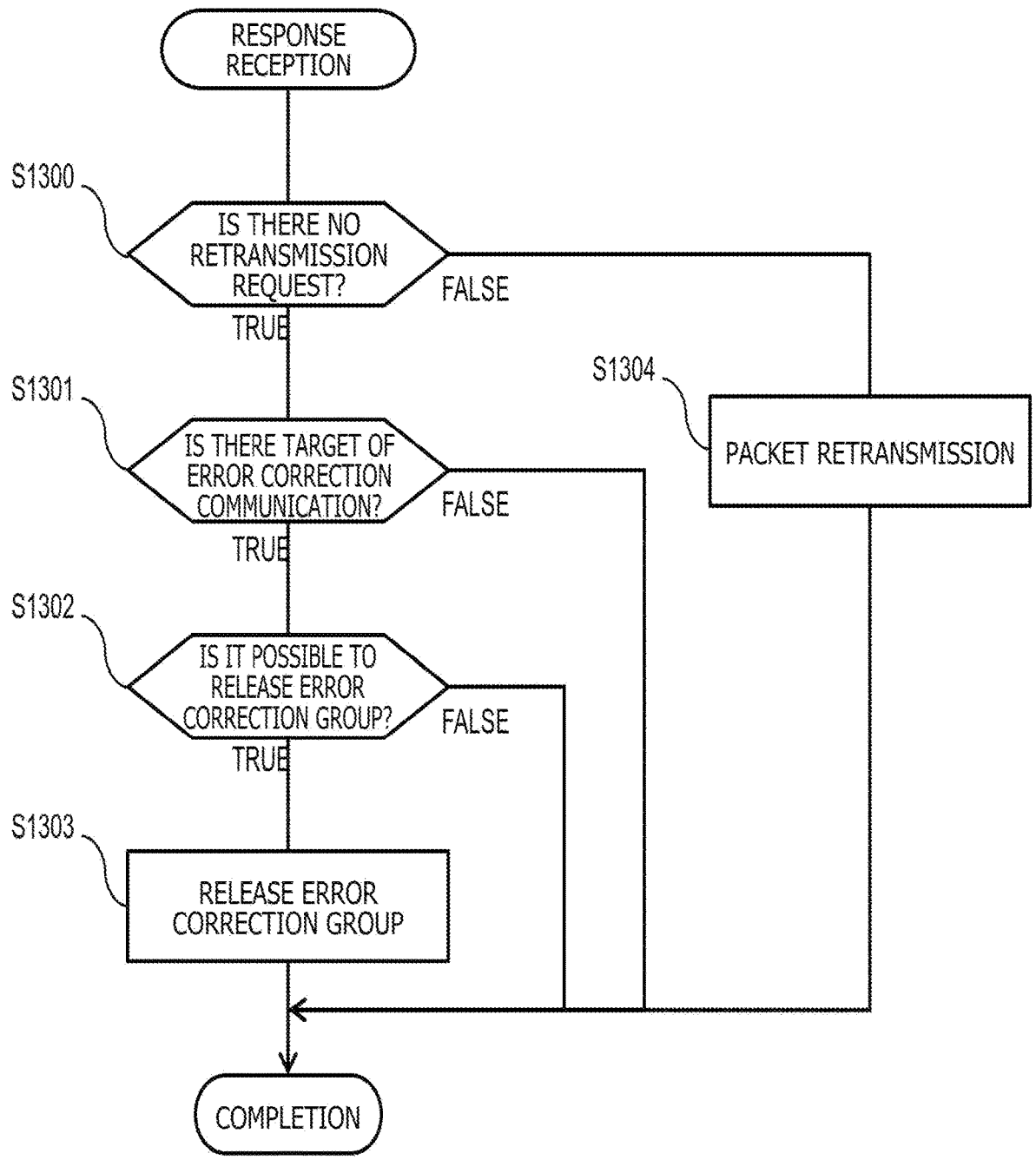
FIG. 13 is a flow chart for describing retransmission or completion processing when receiving a response in error correction communication.

FIG. 13 illustrates a flow chart for describing retransmission or completion processing in error correction communication according to the embodiment. In response reception, the error correction processing 307 on the transmitting side receives a response from the receiving side with respect to transmission of a network packet, and determines whether there is no retransmission request in the response (step S1300). In a case where there is no retransmission request (step S1300: TRUE), the error correction processing 307 determines whether there is a target of error correction communication (step S1301). In the case where there is no error correction communication target (step S1301: FALSE), the network interface 103 performs processing with respect to the response, and completes the processing after releasing various resources that have been used for network packet transmission and should be released.

In the case where there is an error correction communication target (step S1301: TRUE), a determination as to whether the error correction group can be released is also made (step S1302). In addition, in the case of using range information for which a response is received in, for example, a redundant data calculation for error correction processing, not being able to release the error correction group is decided (step S1302: FALSE). The network interface 103 performs processing with respect to the response, and completes.

By all packets for an error correction group range being received by the receiving side and the connection being closed, for example, the error correction group becomes unnecessary for calculating redundant data or the like, and can be released (step S1302: TRUE). The error correction processing 307 releases the error correction group (step S1303). The network interface 103 performs processing with respect to the response, and completes. In addition, if data used for transmission of network packets for which a response is received is not necessary for, for example, generation of redundant data, the error correction processing 307 releases various resources that have been used for transmission of these network packets and should be released.

Meanwhile, in a case where there is a retransmission request (step S1300: FALSE), the retransmission processing 312 performs processing for packet retransmission (step S1304), and completes processing with respect to the response. The retransmission processing 312 retransmits a network packet designated in the response. This designation may be a single network packet, for example, or a range for a plurality of network packets may be designated.

In the packet retransmission, the data transmission illustrated in FIG. 11 is performed again with respect to a packet to transmit. Note that, taking into account that this is retransmission, it is sufficient to not perform some processing in FIG. 11 if the processing is not necessary, and, for example, a network packet buffered in the network packet generation and transmission processing (step S1105) or the like may be transmitted again. In addition, management of, for example, a different redundancy level for retransmission, and transmission of a redundant packet may be performed.

In the case where an update request for information pertaining to error correction processing is included in a response that is received, the error correction processing 307, the data-transmission-time error correction processing 308, or the command-transmission-time error correction processing 310 updates the error correction communication destination management table 901 or the error correction management table (transmission management) 904 in accordance with contents of the update request.

By this flow, it is possible to transfer a network packet to the receiving side by, with respect to a response request, performing processing for the case of error correction communication or, in the case where error correction is not possible in error correction communication, transmitting data again in accordance with retransmission processing.

Figure 14:
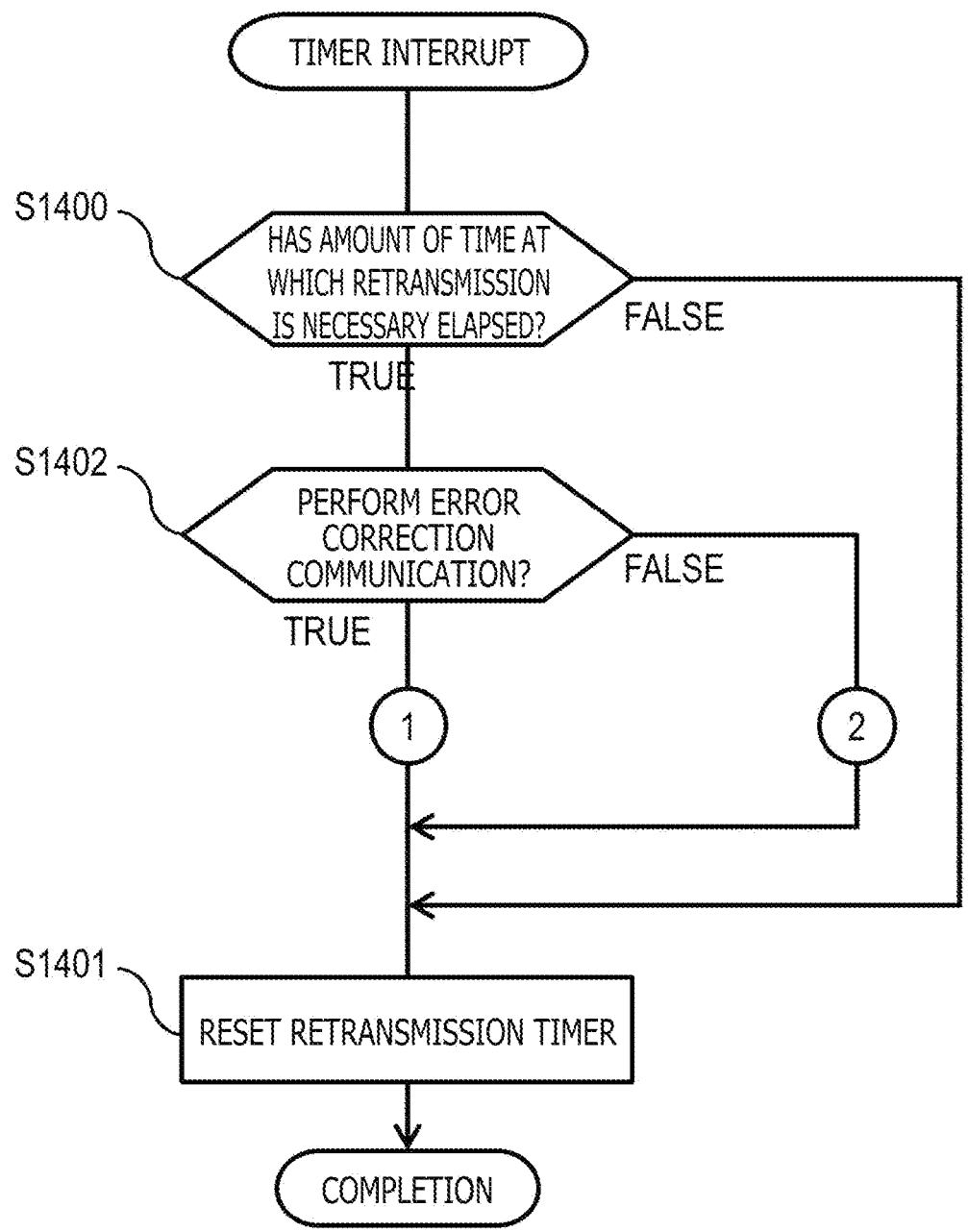
FIG. 14 is a flow chart for describing retransmission or completion processing at a time of a retransmission timer interrupt in error correction communication.

FIG. 14 illustrates a flow chart for describing retransmission or completion processing due to a retransmission timer interrupt on the retransmission side, in error correction communication according to the embodiment. With respect to a timer interrupt in the network interface 103, the network protocol processing 306 determines whether an amount of time at which retransmission is necessary has elapsed (step S1400). If the amount of time at which retransmission is necessary has not elapsed, the network protocol processing 306 completes the processing (step S1400: FALSE). At this time, the retransmission timer may be reset, if necessary (step S1401).

In a case where an amount of time at which retransmission is necessary has elapsed (step S1400: TRUE), the network protocol processing 306 determines whether the retransmission target is for error correction communication (step S1402). If the retransmission target is not for error correction communication (step S1402: FALSE), the network interface 103 performs the processing from the connector 2 in FIG. 11, and if necessary, resets the retransmission timer (step S1401), and completes the processing.

Meanwhile, in a case where the retransmission target is for error correction communication (step S1402: TRUE), the network interface 103 performs the processing from the connector 1 in FIG. 11, and if necessary, resets the retransmission timer (step S1401), and completes the processing. Note that retransmission may be retransmission of a network packet, or may be retransmission of redundant data in accordance with an error correction communication setting. In addition, the level of redundancy when retransmitting may be changed in accordance with a status of or a setting for error correction communication. Furthermore, an update of the retransmission timer may be changed in accordance with, for example, a communication status or the number of retransmissions, or the number of retransmissions of the same packet may be managed, with retransmission of the packet being cut off in accordance with the number of retransmissions.

By this flow, by retransmitting a network packet even if there is no response from the receiving side, such as where a response from the receiving side is lost, it is possible to transfer the network packet to the receiving side. In addition, sending only redundant packets for error correction enables efficient use of network bandwidth.

Figure 15A:
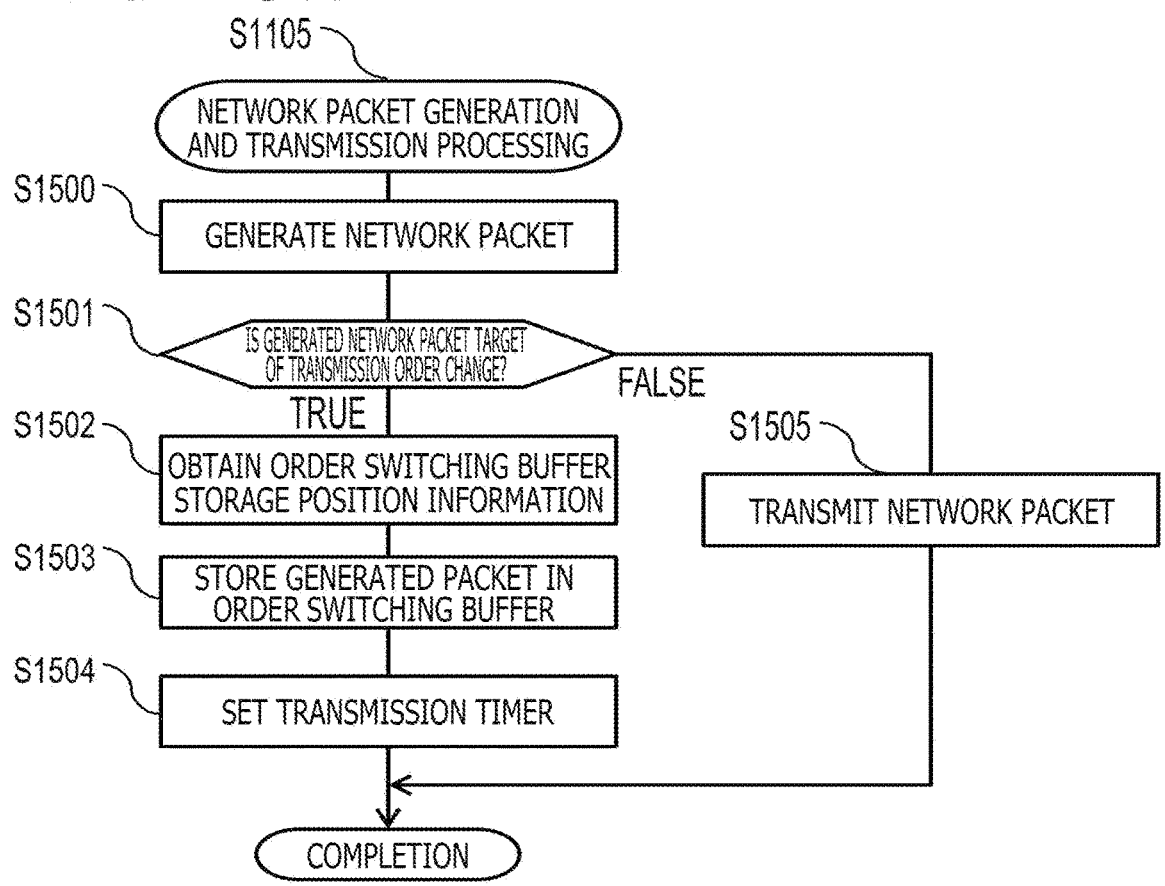
FIG. 15A is a flow chart for describing operation for changing a transfer order in accordance with an error correction method and an error correction level.
Figure 15B:
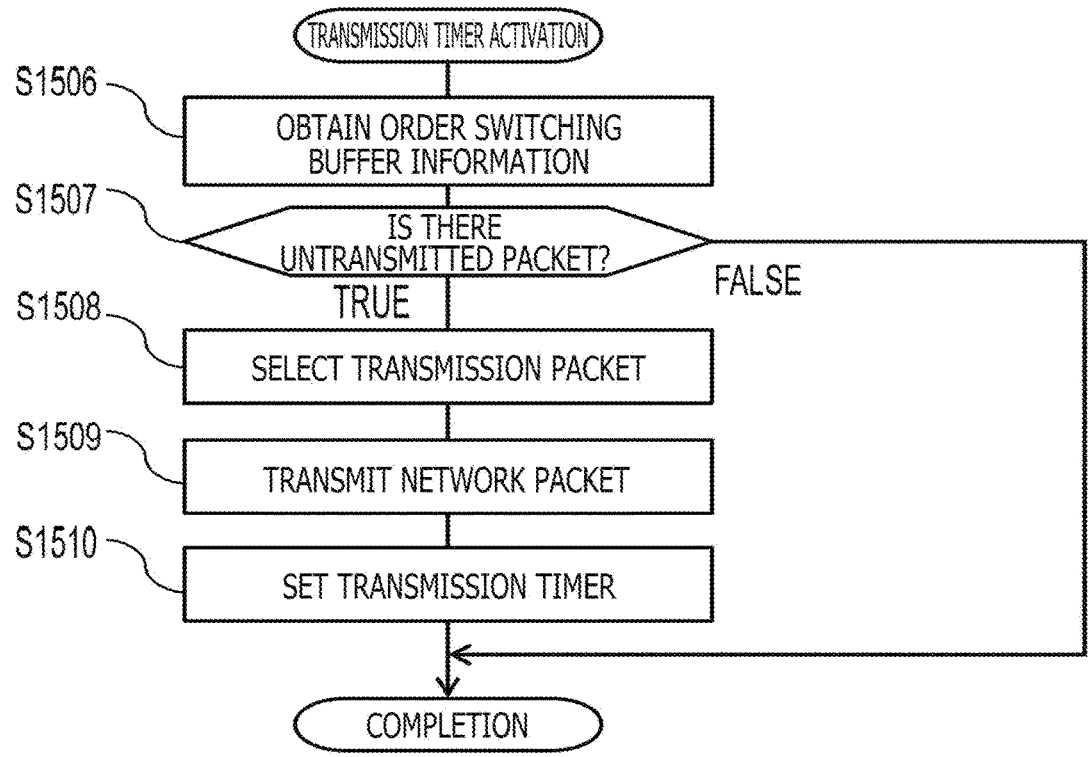
FIG. 15B is a flow chart for describing operation for changing a transfer order in accordance with an error correction method and an error correction level.

FIGS. 15A and 15B illustrate flow charts for describing operation for changing a transfer order in accordance with an error correction method and an error correction level, according to the embodiment. With reference to FIG. 15A, in the network packet generation and transmission processing (step S1105), the network protocol processing 306 generates a network packet (step S1500).

The network protocol processing 306 refers to the error correction communication destination management table 901 to confirm the error correction method, the error correction level, and the loss tendency for the destination, and determines whether the generated network packet is a target of a transmission order change (step S1501). The generated network packet is determined to be a target of a transmission order change in a case where error occurrences are bursty and an error correction method in which packets in the same error correction group are not consecutively transmitted is determined to be effective.

For example, in a case where a count number for a burst loss tendency is greater than a count number for a random loss tendency, error occurrences are determined to be bursty. It may be that a threshold is set with respect to an error correction method, and a transmission order change target is determined in a case where a level of redundancy for an error correction level is less than the threshold.

In a case where the generated network packet is not a target of a transmission order change (step S1501: FALSE), the network protocol processing 306 transmits the network packet (step S1505). In the case where the generated network packet is a target of a transmission order change (step S1501: TRUE), the network protocol processing 306 obtains storage position information with respect to an order switching buffer (step S1502) and stores the generated network packet in the order switching buffer (step S1503). A transmission timer is then set (step S1504).

Order switching mixes the sending of network packets of the same group and the same connection with different groups and different connections as much as possible to thereby perform control such that there is a higher probability of a random error even when a burst error would occur.

With reference to FIG. 15B, in the processing for activating the transmission timer that has been set, the transmission processing is activated again when the amount of time for the timer has elapsed. The network protocol processing 306 obtains order switching buffer information (step S1506), determines whether there is an untransmitted packet (step S1507), and, in the case where there is no untransmitted packet (step S1507: FALSE), ends the processing. In the case where there is an untransmitted packet (step S1507: TRUE), the network protocol processing 306 selects a transmission packet (step S1508) and transmits a network packet (step S1509). The transmission timer is set again (step S1510), and the processing completes.

By this flow, by changing the transfer order in accordance with the error correction method and the error correction level, for example, in a case where a burst error has occurred and error correction is not possible, by making a burst error into a random error, error correction becomes possible.

Figure 16:
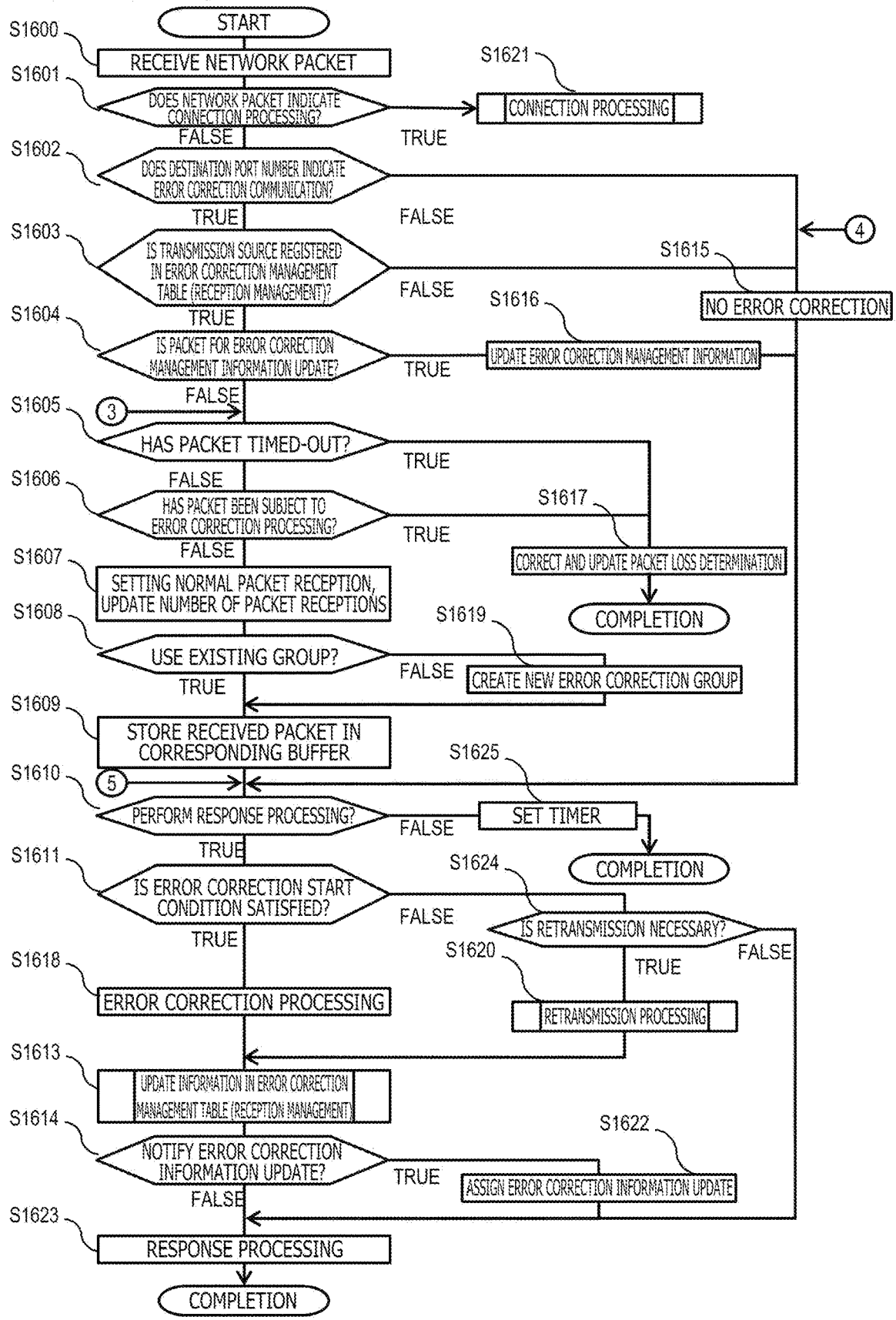
FIG. 16 is a flow chart for describing an error correction processing operation at a time of data reception.

FIG. 16 illustrates a flow chart for describing an error correction processing operation at a time of data reception, according to the embodiment. The network interface 103 receives a network packet (step S1600). Next, the control command processing 302 determines whether the network packet indicates connection processing (step S1601).

In the case where the network packet indicates connection processing (step S1601: TRUE), the error correction processing 307 executes connection processing (step S1621). In the case where the network packet does not indicate connection processing (step S1601: FALSE), the control command processing 302 determines whether the destination port number indicates error correction communication (step S1602). In the case where the destination port number does not indicate error correction communication (step S1602: FALSE), the network interface 103 processes the received packet without error correction (step S1615).

In the case where the destination port number indicates error correction communication (step S1602: TRUE), the error correction processing 307 determines whether the transmission source is registered in the error correction management table (reception management) 909 (step S1603). In the case where the transmission source is not registered (step S1603: FALSE), the network interface 103 processes the received packet without error correction (step S1615).

In the case where the transmission source is registered (step S1603: TRUE), the error correction processing 307 determines whether the received network packet is a packet for an error correction management information update (step S1604). In the case where the received network packet is a packet for an error correction management information update (step S1604: TRUE), the error correction processing 307 processes the network packet and updates the error correction management information 900 (step S1616).

In the case where the received network packet is not a packet for error correction management information update (step S1604: FALSE), the error correction processing 307 determines whether the received network packet is a timed-out network packet (step S1605). In the case of a timed-out network packet (step S1605: TRUE), the error correction processing 307 determines that a packet which is determined to be a lost network packet has arrived late, corrects and updates information regarding the packet loss determination in management information (not shown) (step S1617), and completes the network packet reception processing.

In the case where the received network packet is not a timed-out network packet (step S1605: FALSE), the error correction processing 307 refers to management information (not shown) to determine whether the received packet has been subject to error correction processing (step S1606). In the case of a network packet that has been subject to error correction processing (step S1606: TRUE), the error correction processing 307 determines that the packet which is determined to be a lost network packet has arrived late. The error correction processing 307 corrects and updates the information regarding the packet loss determination in the management information (not shown) (step S1617), and completes the network packet reception processing. Packets that have been subject to error correction processing include packets that have been reactivated in accordance with error correction processing that uses redundant packets.

In the case where the received packet is not a network packet that has been subject to error correction processing (step S1606: FALSE), the error correction processing 307, setting normal packet reception in the error correction group indicated by the error correction header 603, updates the number of packet receptions for the error correction group (step S1607).

The error correction processing 307 then determines whether the error correction group that manages the range of error correction processing indicated by the error correction header is already registered in the management information (not shown) (step S1608). In the case where the error correction group is not registered (step S1608: FALSE), the error correction processing 307 newly registers the error correction group indicated by the error correction header (step S1619).

In the case where the error correction group is registered (step S1608: TRUE), the error correction processing 307 uses the existing group and stores the received packet in a corresponding buffer (step S1609). At this point, in order to calculate redundant data, the error correction group manages a buffer memory for managing received packets relating to the error correction group, or storage destination address information of received packets relating to the error correction group.

Next, the error correction processing 307 determines whether to perform response processing (step S1610). In a case where the number of received packets is less than a threshold (step S1610: FALSE), in order to perform combined response processing after received packets have built up, the error correction processing 307 sets a timer for the next response processing (step S1625), and completes the reception processing. After consolidating received packets to a certain degree such as in TCP window control, the response processing returns a response to thereby reduce the transaction performance load for returning responses.

In the case of performing response processing (step S1610: TRUE), the error correction processing 307 determines whether an error correction start condition is satisfied (step S1611). In a case where there is no target of error correction processing or packet reproduction is not possible as a state of reception satisfying an error correction level or an error correction method for starting error correction processing has not been entered (step S1611: FALSE), the error correction processing 307 determines whether retransmission is necessary (step S1624).

If retransmission is unnecessary (step S1624: FALSE), the control command processing 302 performs response processing for the received packet (step S1623), and the reception processing for the network packet completes. If retransmission is necessary (step S1624: FALSE), the retransmission processing 312 performs retransmission processing (step S1620). Note that retransmission processing is described below.

In a case where the error correction start condition is satisfied (step S1611: TRUE), the data-reception-time error correction processing 309 or the command-reception-time error correction processing 311 performs error correction processing on received packets to thereby perform error correction processing for reproducing the lost network packet (step S1618).

Furthermore, the error correction processing 307 updates information in the error correction management table (reception management) 909 (step S1613), and determines whether to notify the transmitting side of an error correction information update (step S1614). In a case where no notification is performed (step S1614: FALSE), the control command processing 302 performs response processing for the received packet (step S1623), and the reception processing for the network packet completes.

In the case of performing a notification (step S1614: TRUE), the error correction processing 307 reflects a result of performing an error correction information update to the response (step S1622). The control command processing 302 performs response processing for the received packet (step S1623), and the reception processing for the network packet completes. Note that the update of the information in the error correction management table (reception management) 909 is described below.

As a result of the response processing (step S1623), in a case where the target network packet which is in an error correction group becomes unnecessary for error correction processing, the error correction group is released. The error correction group is also released when the connection is closed.

Note that, when a redundant packet is lost on a network route, there is no need to request retransmission of the redundant packet if all network packets that were originally to be transferred have been received. By this flow, a determination is made as to whether error correction processing is possible with respect to received network packets, and if error correction processing is possible, error correction processing is performed, and a network packet lost on the network route is reproduced by the receiving side.

Figure 17:
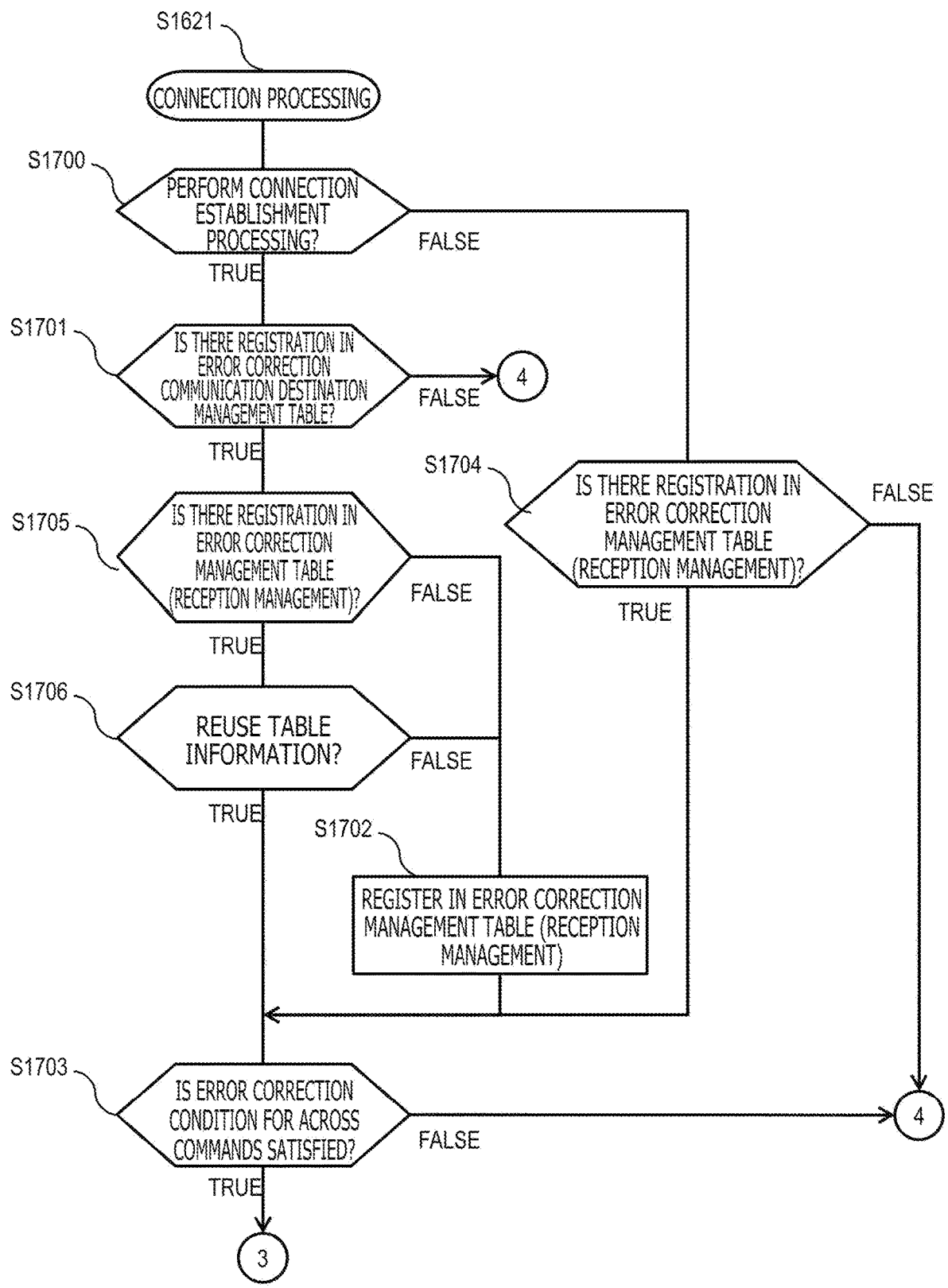
FIG. 17 is a flow chart for describing an error correction processing operation at a time of reception of a connection processing command.

FIG. 17 illustrates a flow chart for describing an error correction processing operation at a time of reception of a connection processing command, according to the embodiment. In the connection processing (step S1621), the error correction processing 307 first determines whether to perform connection establishment processing (step S1700). In the case of not performing connection establishment processing (step S1700: FALSE), the error correction processing 307 determines whether registration has been made to the error correction management table (reception management) 909 (step S1704). In the case where there is no registration (step S1704: FALSE), the processing from the connector 4 in FIG. 16 is performed. In the case where there is registration (step S1704: true), the error correction processing 307 proceeds to determine whether an error correction condition for across commands is satisfied (step S1703).

In the case of performing connection establishment processing (step S1700: TRUE), the error correction processing 307 determines whether registration has been made to the error correction communication destination management table 901 (step S1701). In the case where there is no registration (step S1701: FALSE), the processing from the connector 4 in FIG. 16 is performed. In the case where there is registration (step S1701: TRUE), determination is made as to whether registration has been made to the error correction management table (reception management) 909 (step S1705). In the case where there is no registration (step S1705: FALSE), registration is performed to the error correction management table (reception management) 909 (step S1702), and the processing proceeds to determine whether the error correction condition for across commands is satisfied (step S1703).

In the case where registration has been made to the error correction management table (reception management) 909 (step S1705: TRUE), the error correction processing 307 determines whether to reuse the table information (step S1706). For example, in a case where the table information is cached, the error correction processing 307 reuses the table information in accordance with a setting in control information (step S1706: TRUE). In the case of not reusing table information (step S1706: FALSE), the error correction processing 307 performs registration to the error correction management table (reception management) 909 (step S1702), and proceeds to determine whether the error correction condition for across commands is satisfied (step S1703).

In the determination of whether the error correction condition for across commands is satisfied (step S1703), in the case where the error correction condition for across commands is not satisfied (step S1703: FALSE), the processing from the connector 4 in FIG. 16 is executed. Meanwhile, in a case where the error correction condition for across commands is satisfied (step S1703: TRUE), such as in a case where an error correction group is formed across commands on the transmitting side, the processing is executed from the connector 3 of FIG. 16.

By this flow, a determination is made for error correction processing for when a command is received, and even if a command is lost on the network route, it is possible to reproduce the command.

Figure 18:
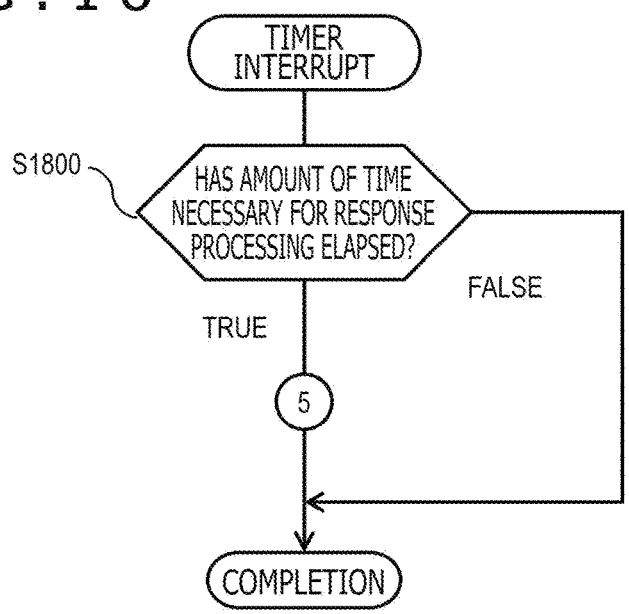
FIG. 18 is a flow chart for describing retransmission or completion processing at a time of a response processing timer interrupt in error correction communication.

FIG. 18 illustrates a flow chart for describing retransmission or completion processing in error correction communication according to the embodiment. In a case where, in accordance with a determination of whether to perform response processing (step S1610), a timer setting for responding in a consolidated fashion without immediately responding is made (step S1625), the error correction processing 307 determines if an amount of time necessary for response processing has elapsed when a timer interrupt occurs (step S1800). In a case where the amount of time necessary for response processing has not elapsed (step S1800: FALSE), the error correction processing 307 completes timer interrupt processing. In a case where an amount of time necessary for response processing has elapsed (step S1800: TRUE), the processing from the connector 5 in FIG. 16 is executed.

By this flow, by performing response processing from the receiving side to the transmitting side in a consolidated fashion, it is possible to reduce the load on the network interface 103 at the receiving side due to response processing and efficiently use network bandwidth.

Figure 19:
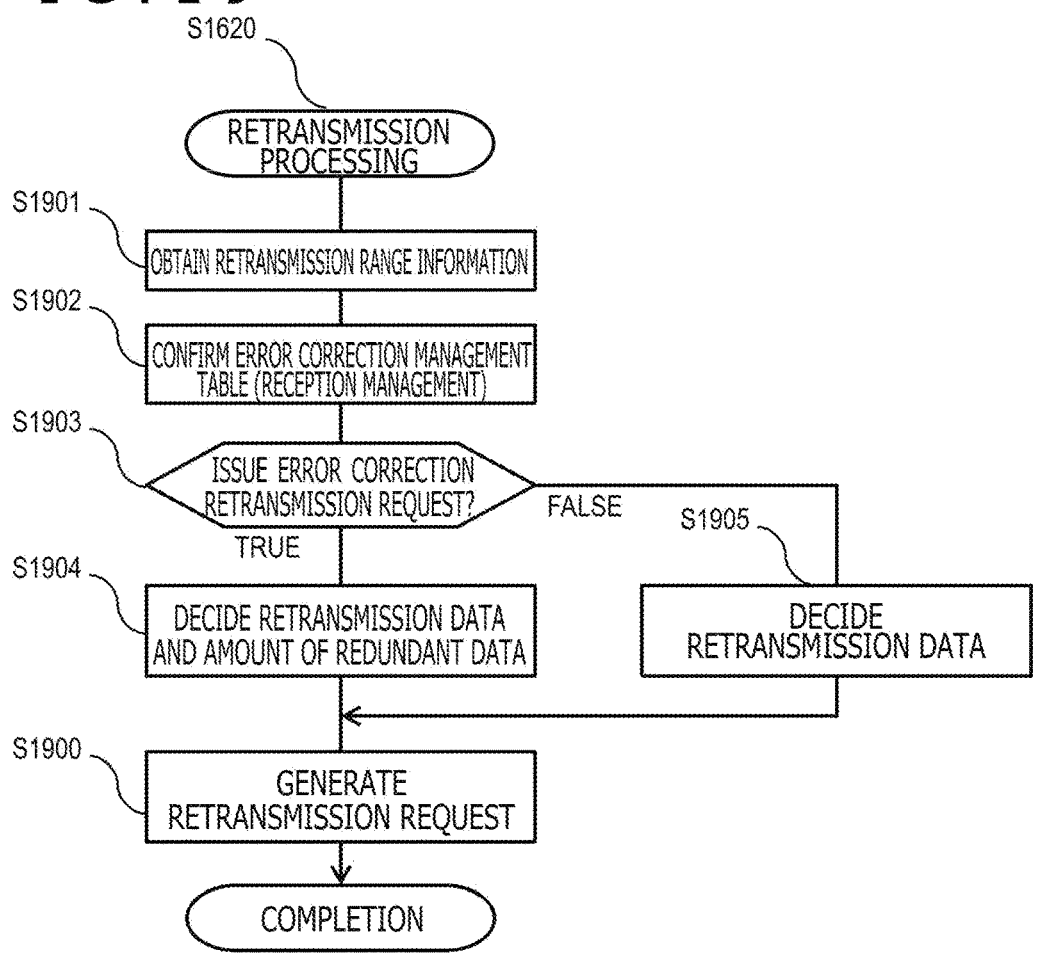
FIG. 19 is a flow chart for describing retransmission processing operation at a time when error correction is not possible.

FIG. 19 illustrates a flow chart for describing retransmission processing operation at a time when error correction is not possible, according to the embodiment. In the retransmission processing for the network interface 103 on the receiving side (step S1620), firstly, the retransmission processing 312 obtains range information such as a sequence number for a network packet that needs retransmission (step S1901), confirms the error correction management table (reception management) 909 (step S1902), and determines whether to issue an error correction retransmission request (step S1903).

In the case of not issuing an error correction retransmission request or in a case where there is no error correction communication (step S1903: FALSE), the retransmission processing 312 decides the retransmission data (step S1905). The retransmission processing 312 generates a retransmission request, and makes a response to the transmitting side with a network packet that includes a retransmission request (step S1900).

Meanwhile, the retransmission processing 312 confirms the error correction management table (reception management) 909 (step S1902) and, for example, in a case where the retransmission processing 312 determines that it is better to increase the error correction level on the basis of the number of retransmissions or a packet loss status, decides to issue an error correction retransmission request (step S1903: TRUE).

For example, in a case where the packet loss rate exceeds a threshold with respect to the error correction level, a determination may be made to increase the error correction level. The number of retransmissions may be referred to in place of the packet loss rate. Alternatively, both the number of retransmissions and the packet loss rate may be referred to. For example, determination may be made to increase the correction level in a case where the number of retransmissions exceeds a threshold and the most recent packet loss rate also exceeds a threshold.

The retransmission processing 312 decides the retransmission data and the amount of redundant data, and reflects parameter update information such as the error correction level of error correction information (step S1904), generates a retransmission request, and makes a response to the transmitting side with a network packet that includes the retransmission request (step S1900).

By this flow, it is possible to transfer a network packet from the transmitting side to the receiving side in accordance with retransmission processing, even in the case where it is not possible to reproduce network packets in accordance with error correction processing. In addition, by updating the error correction level, it is possible to perform error correction processing even if the status of the network route is not good and the network packet loss rate has increased.

Figure 20:
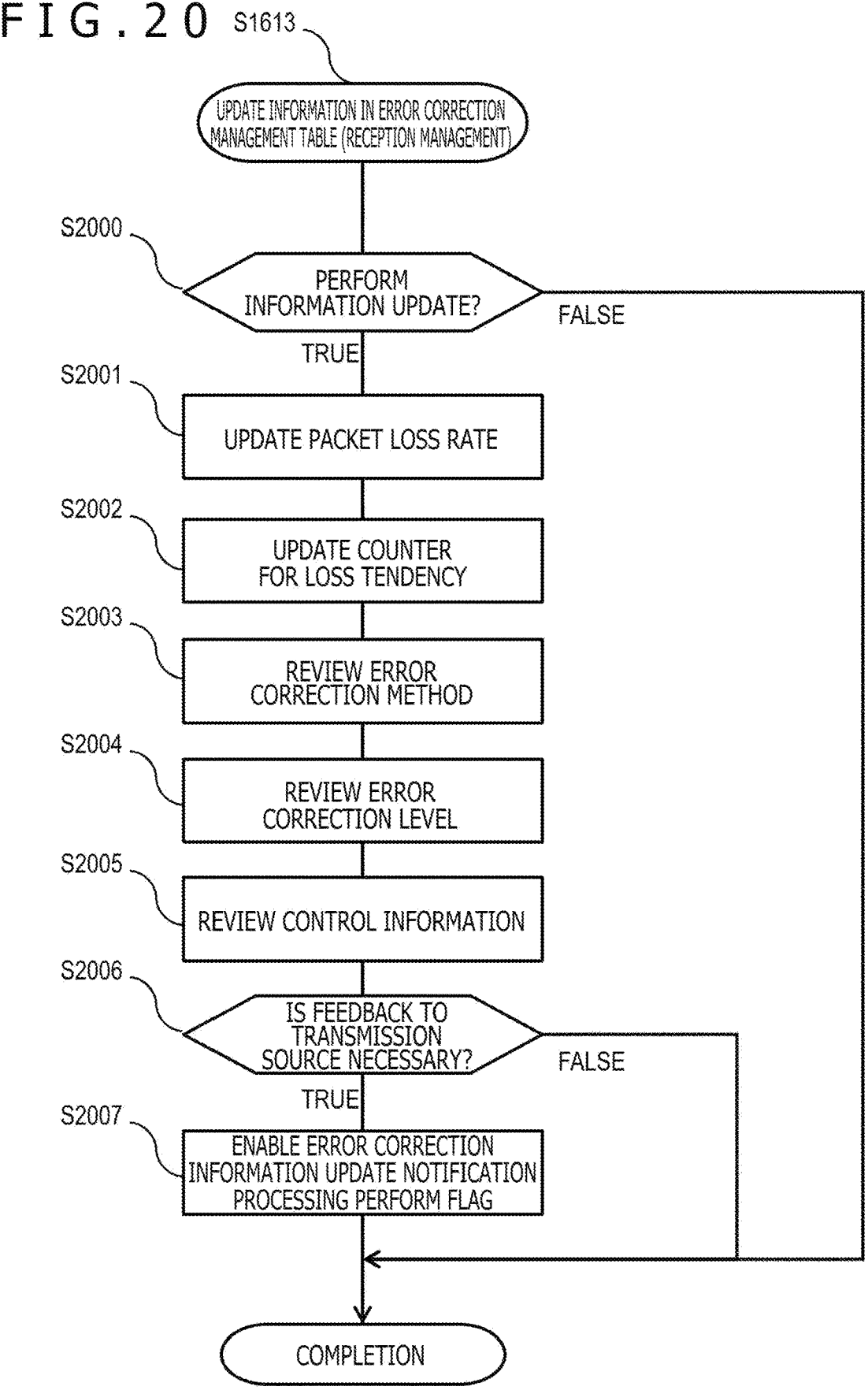
FIG. 20 is a flow chart for describing operation for processing for changing the error correction level.

FIG. 20 illustrates a flow chart for describing operation for processing for changing the error correction level, according to the embodiment. At the network interface 103 on the receiving side, in the information update of the error correction management table (reception management) 909 (step S1613), firstly, the error correction processing 307 determines whether to update information (step S2000). The error correction processing 307 determines to update information at a frequency of one time every predetermined number of times whether to update information is determined, for example. If an information update is unnecessary (step S2000: FALSE), the processing completes. If an information update is necessary (step S2000: TRUE), various pieces of information in the error correction management table (reception management) 909 are updated.

For example, in packet loss rate updating (step S2001), the error correction processing 307 measures and calculates, for each transmission source 910, how many packets are lost over a set time period. The packet loss rate may be held after being calculated from various perspectives, such as a continuous loss rate and a loss rate in most recent communication.

In a loss tendency counter update (step S2002), the error correction processing 307 measures a tendency for how packets are lost. For example, in a case where packets are lost consecutively, the error correction processing 307 determines that there is a burst error and updates a counter for burst tendency. Note that additional information such as the maximum number of packets lost consecutively may be obtained and held. Furthermore, in a case where a single packet is lost, the error correction processing 307 determines that there is a random error and updates a counter for random tendency. Note that it may be that a time period is decided, and a random error occurrence rate over this time period is calculated and held.

In a review of the error correction method (step S2003), the error correction processing 307 analyzes, for example, a packet loss rate and information on the loss tendency (burst, random), and determines whether to change the error correction information of the destination. In addition to the above items, reference may be made to information regarding the number of packet retransmissions.

In the case of changing the error correction information, for example, the error correction information is changed to an algorithm strong against burst loss in a case where the burst loss tendency is high. In addition, the error correction information is changed to an algorithm strong against random loss in a case where the random loss tendency is high. Each tendency is represented by a count number. That a difference between count numbers for the two loss tendencies exceeds a threshold may be a condition for changing the algorithm. Note that, in order to change a burst loss tendency to a random loss tendency, a setting may be made to change the transmission timing of network packets such that there is a random tendency in units of error correction groups.

In a review of the error correction level (step S2004), the error correction processing 307, on the basis of the packet loss rate, determines whether the error correction level of the destination should be changed. In the case of changing the error correction level of the destination, for example, a level change that increases the level of redundancy and/or reduces the number of transmission data packets in an error correction group is performed in a case where the packet loss rate is greater than a threshold corresponding to the error correction level, and a level change that reduces the level of redundancy is performed in a case where the packet loss rate is less than another threshold that corresponds to the error correction level.

Change of the error correction level may be determined on the basis of both a long-term loss rate and a most recent loss rate. For example, the error correction level may be increased in a case where both loss rates exceed respective thresholds. In addition, the error correction level may be increased in a case where an average number of retransmissions for an error correction group exceeds a threshold that corresponds to the error correction level. Change of the error correction level may be determined on the basis of both the number of retransmissions and the loss rate. Note that it may be that changing only one of the error correction method and the error correction level is possible. For the error correction level, it may be that changing only one of the level of redundancy and an amount of data (number of packets) is possible.

In a review of control information (step S2005), the error correction processing 307 changes parameters such as various kinds of timer information or the number of retransmissions in accordance with the status of error correction communication.

In accordance with the updates described above, the error correction processing 307 determines whether feedback to the transmitting side is necessary (step S2006). In a case where feedback is unnecessary (step S2006: FALSE), the error correction processing 307 completes the processing. In a case where feedback is necessary (step S2006: TRUE), the error correction processing 307 enables an error correction information update notification processing perform flag (step S2007), and performs processing for assigning an error correction information update (step S1622).

By this flow, it is possible to efficiently use the network by updating the error correction processing in accordance with the latest status of the network route.

Note that the present invention is not limited to the embodiment described above, and includes various variations. For example, the embodiment described above is something that is described in detail in order to describe and facilitate understanding of the present invention, and there is not necessarily a limitation to including all configurations described. In addition, it is possible to replace a portion of a configuration of an embodiment with a configuration of another embodiment, and it is possible to add, to the configuration of an embodiment, a configuration of another embodiment. In addition, adding, deleting, or replacing another configuration in relation to a portion of a configuration of each embodiment is possible.

In addition, some or all of each configuration, function, processing unit, or the like described above may be realized by hardware such as that designed on an integrated circuit, for example. In addition, each configuration, function, or the like described above may be realized by software in accordance with a processor interpreting and executing a program for realizing various functions. Information such as programs, tables, and files for realizing each function can be placed in a recording apparatus such as a memory, a hard disk, or an SSD, or a recording medium such as an integrated circuit (IC) card or a secure digital (SD) card.

In addition, control lines or information lines indicate something considered to be necessary for the description, and there is not necessarily a limitation to all control lines or information lines for a product being illustrated. It may be considered that, in practice, almost all configurations are mutually connected.

What is claimed is:

1. A network interface for a storage controller, the network interface comprising:
a processor; and
a memory configured to store an instruction code to be executed by the processor,
wherein the processor:
executes protocol processing for transmitting and receiving packets via a network; and
reproduces a first packet not received from the network, from a plurality of other received packets included in an error correction packet group same as that of the first packet.

2. The network interface according to claim 1,
wherein, in the error correction packet group, the processor selects from the error correction packet group an unreceived packet that is necessary for reproducing the first packet, and requests a transmission source of the error correction packet group to retransmit the unreceived packet.

3. The network interface according to claim 1,
wherein the error correction packet group includes packets for a plurality of connections.

4. The network interface according to claim 3,
wherein the error correction packet group includes a packet that stores a command.

5. The network interface according to claim 1,
wherein the memory stores error correction management information that is for reproducing an unreceived packet and is associated with a packet transmission source,
wherein the error correction management information includes at least one of an error correction level and an error correction algorithm, and
wherein the processor changes at least one of the error correction level and the error correction algorithm on a basis of a reception status of packets from the transmission source.

6. The network interface according to claim 5,
wherein the error correction level indicates at least one of the number of redundant packets and the number of user data packets in an error correction packet group.

7. The network interface according to claim 5,
wherein the processor selects, on the basis of the reception status, an error correction algorithm suitable for burst loss or random loss of packets.

8. The network interface according to claim 1,
wherein the processor switches a packet transmission order between different error correction packet groups.

9. The network interface according to claim 1,
wherein the processor assigns, on a basis of information set in advance, an error correction header to a packet that includes a network header for the network or to a packet that does not include the network header.

10. The network interface according to claim 1,
wherein the processor:
   reproduces, from some received packets of the error correction packet group, an unreceived packet storing user data of the error correction packet group; and,
   after reproducing the unreceived packet storing the user data, discards a packet which is received via the network and has the same user data.

11. A storage system comprising:
a first storage controller that includes the network interface according to claim 1; and
a second storage controller that includes a second network interface,
wherein the network interface of the first storage controller and the second network interface transmit and receive packets via a network,
wherein the second network interface includes:
   a processor; and
   one or more memories configured to store an instruction code to be executed by the processor, and
wherein the processor:
   executes protocol processing for transmitting and receiving packets via the network; and
   reproduces a second packet not received from the network, from a plurality of other received packets included in an error correction packet group same as that of the second packet.

12. A storage system comprising:
a storage controller that includes the network interface according to claim 1; and
a drive box,
wherein the drive box includes:
   a plurality of storage drives; and
   a third network interface configured to transmit and receive packets to and from the network interface of the storage controller via the network,
the third network interface includes:
   a processor; and
   one or more memories configured to store an instruction code to be executed by the processor, and
the processor:
   executes protocol processing for transmitting and receiving packets via the network; and
   reproduces a third packet not received from the network, from a plurality of other received packets included in an error correction packet group same as that of the third packet.

\* \* \* \* \*